US010375567B2

(12) United States Patent
Xiong

(10) Patent No.: US 10,375,567 B2
(45) Date of Patent: Aug. 6, 2019

(54) METHOD FOR DISTRIBUTING VIRTUAL SIM CARD, METHOD FOR ACCESSING NETWORK, AND RELATED DEVICES

(71) Applicant: HUAWEI TECHNOLOGIES CO., LTD., Shenzhen, Guangdong (CN)

(72) Inventor: Yingying Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/097,356

(22) PCT Filed: Apr. 29, 2016

(86) PCT No.: PCT/CN2016/080844
§ 371 (c)(1),
(2) Date: Oct. 29, 2018

(87) PCT Pub. No.: WO2017/185382
PCT Pub. Date: Nov. 2, 2017

(65) Prior Publication Data
US 2019/0149979 A1 May 16, 2019

(51) Int. Cl.
H04W 8/18 (2009.01)
H04W 60/04 (2009.01)
(Continued)

(52) U.S. Cl.
CPC ........... *H04W 8/183* (2013.01); *H04W 48/16* (2013.01); *H04W 60/04* (2013.01); *H04W 8/205* (2013.01)

(58) Field of Classification Search
CPC ..... H04W 8/183; H04W 48/16; H04W 60/04; H04W 8/205
See application file for complete search history.

(56) References Cited

U.S. PATENT DOCUMENTS

2010/0210304 A1* 8/2010 Huslak ............... G06Q 10/10
455/558
2011/0003618 A1* 1/2011 Tang .................. H04W 8/183
455/558

(Continued)

FOREIGN PATENT DOCUMENTS

CN 103313394 A 9/2013
CN 103987024 A 8/2014
(Continued)

OTHER PUBLICATIONS

International Search Report and Written Opinion issued in International Application No. PCT/CN2016/080844 dated Jan. 18, 2017, 17 pages.
Extended European Search Report issued in European Application No. 16899893.8 dated Mar. 14, 2019, 8 pages.

*Primary Examiner* — Mehmood B. Khan
(74) *Attorney, Agent, or Firm* — Fish & Richardson P.C.

(57) ABSTRACT

The present invention discloses a method for distributing a virtual SIM card, a method for accessing a network, and related devices. The method for accessing a network includes: determining, from at least two primary virtual SIM cards, at least two candidate primary virtual SIM cards that match a network environment parameter of a visited place of a mobile device; downloading a secondary virtual SIM card by using an accessed primary virtual SIM card that is in the at least two candidate primary virtual SIM cards and that successfully registers with and accesses a network; and accessing a target mobile network of the visited place by using the secondary virtual SIM card. Embodiments of the present invention help improve a network access success rate and network access reliability of the mobile device and reduce operation costs.

16 Claims, 16 Drawing Sheets

(51) Int. Cl.
*H04W 48/16* (2009.01)
*H04W 8/20* (2009.01)

(56) References Cited

U.S. PATENT DOCUMENTS

| | | | | |
|---|---|---|---|---|
| 2011/0028135 | A1* | 2/2011 | Srinivasan | H04M 3/42382 455/415 |
| 2013/0023235 | A1* | 1/2013 | Fan | H04W 48/18 455/411 |
| 2014/0057600 | A1* | 2/2014 | Dung | H04W 8/02 455/411 |
| 2015/0215773 | A1* | 7/2015 | Bai | H04W 8/183 455/418 |
| 2016/0037350 | A1 | 2/2016 | Li et al. | |
| 2016/0050556 | A1 | 2/2016 | Zhao et al. | |
| 2016/0381629 | A1 | 12/2016 | Yang et al. | |
| 2017/0041778 | A1* | 2/2017 | Dowlatkhah | H04W 8/20 |
| 2017/0134945 | A1* | 5/2017 | Goel | H04W 76/38 |
| 2018/0242138 | A1* | 8/2018 | Chen | H04W 8/24 |
| 2019/0007826 | A1* | 1/2019 | Wane | H04W 4/24 |

FOREIGN PATENT DOCUMENTS

| | | | |
|---|---|---|---|
| CN | 104205923 | A | 12/2014 |
| CN | 104955126 | A | 9/2015 |
| CN | 105530623 | A | 4/2016 |
| CN | 105530629 | A | 4/2016 |
| WO | 2017067518 | A1 | 4/2017 |
| WO | 2017088619 | A1 | 6/2017 |

\* cited by examiner

CONT.
FROM
FIG. 5A

S503. Receive the primary virtual SIM card packet obtaining response, and save the primary virtual SIM card packet carried in the primary virtual SIM card packet obtaining response S504. Obtain a network environment parameter of the visited place S505. Determine, from the primary virtual SIM card packet, at least two candidate primary virtual SIM cards that match the network environment parameter S506. Download a secondary virtual SIM card by using an accessed primary virtual SIM card that is in the at least two candidate primary virtual SIM cards and that successfully registers with and accesses a network S507. Access a target mobile network of the visited place by using the secondary virtual SIM card

CONT.
FROM
FIG. 5A

FIG. 5B

S603. Receive the primary virtual SIM card packet obtaining response, and save the primary virtual SIM card packet carried in the primary virtual SIM card packet obtaining response S604. Obtain a network environment parameter of the visited place S605. Determine, from the primary virtual SIM card packet, at least two candidate primary virtual SIM cards that match the network environment parameter S606. Download a secondary virtual SIM card by using an accessed primary virtual SIM card that is in the at least two candidate primary virtual SIM cards and that successfully registers with and accesses a network S607. Access a target mobile network of the visited place by using the secondary virtual SIM card

FIG. 6B

METHOD FOR DISTRIBUTING VIRTUAL SIM CARD, METHOD FOR ACCESSING NETWORK, AND RELATED DEVICES

CROSS-REFERENCE TO RELATED APPLICATIONS

This application is a National Stage of International Patent Application No. PCT/CN2016/080844 filed on Apr. 29, 2016, which is hereby incorporated by reference in its entirety.

TECHNICAL FIELD

The present invention relates to the field of communications technologies, and in particular, to a method for distributing a virtual SIM card, a method for accessing a network, and related devices.

BACKGROUND

In a mobile communications technology, when a subscriber identity module SIM card is installed on a mobile device, the mobile device can register with and access a mobile network of an operator by using the SIM card. A user only needs to purchase a SIM card from a local mobile operator and install the SIM card on the mobile device, and then can use a voice service and a data service provided by the operator. To facilitate SIM card obtaining, a virtual SIM card appears, and the user does not need to purchase a physical SIM card, and only needs to download SIM card data to a terminal by using a network (for example, any data network such as Wireless Fidelity Wi-Fi and the Internet Internet), so as to bring about a same effect as the physical SIM card and use a network service provided by the operator.

In an international roaming scenario, to enable the user to conveniently obtain a mobile network service of a visited place, people further propose a solution of dynamically downloading a virtual SIM card. When the mobile device is delivered or the user enables a related service, a primary virtual SIM card is pre-configured on or downloaded to the mobile device. The primary virtual SIM card has wide coverage, can support a national-scale network registration service, and provides a location discovery function and a capability of providing a basic data network. When entering a visited place, the mobile device can request, by using the primary virtual SIM card, a secondary virtual SIM card that is suitable to be used in the visited place, and in this way, the user can use a better mobile network service with a lower price.

An inventor of this technical solution finds, in a research process, that in the foregoing solution of dynamically downloading a virtual SIM card, network registration reliability of the mobile device is affected by the primary virtual SIM card, and if the primary virtual SIM card cannot reside in a network because the primary virtual SIM card is faulty or the like, the mobile device cannot access the mobile network in the visited place. For a virtual SIM card service operator, as a quantity of users increases, more primary virtual SIM cards are required, and operation costs also sharply increase.

SUMMARY

This application provides a method for distributing a virtual SIM card, a method for accessing a network, and related devices, to improve a network access success rate and network access reliability of a mobile device and reduce operation costs.

According to a first aspect, an embodiment of the present invention provides a method for accessing a network by using a virtual SIM card, applied to a mobile device that stores at least two primary virtual SIM cards, and the method includes:

determining, by the mobile device from the at least two primary virtual SIM cards, at least two candidate primary virtual SIM cards that match a network environment parameter of a visited place of the mobile device; downloading a secondary virtual SIM card by using an accessed primary virtual SIM card that is in the at least two candidate primary virtual SIM cards and that successfully registers with and accesses a network; and accessing a target mobile network of the visited place by using the secondary virtual SIM card.

It may be learned that, in an existing solution, a virtual SIM card server sends a single primary virtual SIM card to the mobile device, and by contrast, in the method for accessing a network by using a virtual SIM card according to this embodiment of the present invention, a situation in which the target mobile network of the visited place cannot be accessed because the single primary virtual SIM card fails to reside in the network can be avoided. Therefore, a network access success rate and network access reliability of the mobile device are improved, and user experience is improved.

With reference to the first aspect, in some possible implementations, the network environment parameter includes a network number of a mobile network found in the visited place, and the determining, by the mobile device from the at least two primary virtual SIM cards, at least two candidate primary virtual SIM cards that match the network environment parameter includes:

querying, by the mobile device by using the network number of the mobile network as a query identifier, a network number set of networks supported by the at least two primary virtual SIM cards, and determining at least two network number sets including the network number and at least two candidate primary virtual SIM cards corresponding to the at least two network number sets.

With reference to the first aspect, in some possible implementations, the network environment parameter includes a network number of a mobile network found in the visited place, and the determining, by the mobile device from the at least two primary virtual SIM cards, at least two candidate primary virtual SIM cards that match the network environment parameter includes:

extracting, by the mobile device, a mobile country code MCC from the network number, querying, by using the MCC as a query identifier, a network number set of networks supported by the at least two primary virtual SIM cards, and determining at least two network number sets including the network number and at least two candidate primary virtual SIM cards corresponding to the at least two network number sets.

With reference to the first aspect, in some possible implementations, the at least two primary virtual SIM cards further include provider quality weights of the supported networks, and the downloading, by the mobile device, a secondary virtual SIM card by using an accessed primary virtual SIM card that is in the at least two candidate primary virtual SIM cards and that successfully registers with and accesses a network includes:

registering with and accessing, by the mobile device, the network in ascending order of the provider quality weights by using the at least two candidate primary virtual SIM cards, determining an accessed primary virtual SIM card that can successfully register with and access the network, and downloading the secondary virtual SIM card by using the accessed primary virtual SIM card to access the network.

According to a second aspect, an embodiment of the present invention provides a method for accessing a network by using a virtual SIM card, including:

determining, by a mobile device from a pre-stored primary virtual SIM card packet, at least two candidate primary virtual SIM cards that match a network environment parameter of a visited place of a mobile device, where a service coverage area of the primary virtual SIM card packet includes the visited place; downloading a secondary virtual SIM card by using an accessed primary virtual SIM card that is in the at least two candidate primary virtual SIM cards and that successfully registers with and accesses a network; and accessing a target mobile network of the visited place by using the secondary virtual SIM card.

It may be learned that, in an existing solution, a virtual SIM card server sends a single primary virtual SIM card to the mobile device, and by contrast, in the method for accessing a network by using a virtual SIM card according to this embodiment of the present invention, a situation in which the target mobile network of the visited place cannot be accessed because the single primary virtual SIM card fails to reside in the network can be avoided. Therefore, a network access success rate and network access reliability of the mobile device are improved, and user experience is improved.

With reference to the second aspect, in some possible implementations, the network environment parameter includes a network number of a mobile network found in the visited place, and the determining, by a mobile device from a pre-stored primary virtual SIM card packet, at least two candidate primary virtual SIM cards that match the network environment parameter includes:

querying, by the mobile device by using the network number of the mobile network as a query identifier, a network number set of networks supported by primary virtual SIM cards in the primary virtual SIM card packet, and determining at least two network number sets including the network number and at least two candidate primary virtual SIM cards corresponding to the at least two network number sets.

With reference to the second aspect, in some possible implementations, the network environment parameter includes a network number of a mobile network found in the visited place, and the determining, by a mobile device from a pre-stored primary virtual SIM card packet, at least two candidate primary virtual SIM cards that match the network environment parameter includes:

extracting, by the mobile device, a mobile country code MCC from the network number, querying, by using the MCC as a query identifier, a network number set of networks supported by primary virtual SIM cards in the primary virtual SIM card packet, and determining at least two network number sets including the network number and at least two candidate primary virtual SIM cards corresponding to the at least two network number sets.

With reference to the second aspect, in some possible implementations, the primary virtual SIM card packet further includes provider quality weights of the networks supported by the primary virtual SIM cards, and the downloading, by a mobile device, a secondary virtual SIM card by using an accessed primary virtual SIM card that is in the at least two candidate primary virtual SIM cards and that successfully registers with and accesses a network includes:

registering with and accessing, by the mobile device, the network in ascending order of the provider quality weights by using the at least two candidate primary virtual SIM cards, determining an accessed primary virtual SIM card that can successfully register with and access the network, and downloading the secondary virtual SIM card by using the accessed primary virtual SIM card to access the network.

With reference to the second aspect, in some possible implementations, before the determining, from a pre-stored primary virtual SIM card packet, at least two candidate primary virtual SIM cards that match a network environment parameter of a visited place of a mobile device, the method further includes:

generating, by the mobile device, a primary virtual SIM card packet obtaining request that carries an area identifier of the visited place, sending the primary virtual SIM card packet obtaining request to a virtual SIM card server, receiving a primary virtual SIM card packet obtaining response that is sent by the virtual SIM card server and that carries the primary virtual SIM card packet, and saving the primary virtual SIM card packet, where the primary virtual SIM card packet is one of M primary virtual SIM card packets, the M primary virtual SIM card packets are obtained by the virtual SIM card server by combining N primary virtual SIM cards according to a preset primary virtual SIM card packet generation policy, M and N are positive integers, and N is less than M.

With reference to the second aspect, in some possible implementations, the primary virtual SIM card packet obtaining response is generated by the virtual SIM card server after the virtual SIM card server receives the primary virtual SIM card packet obtaining request, queries multiple pre-stored primary virtual SIM card packets by using the area identifier of the visited place as a query identifier, obtains at least one unallocated primary virtual SIM card packet whose service coverage area includes the visited place, and randomly selects the primary virtual SIM card packet from the at least one primary virtual SIM card packet; or the primary virtual SIM card packet obtaining response is determined by the virtual SIM card server after the virtual SIM card server receives the primary virtual SIM card packet obtaining request, queries a primary virtual SIM card packet allocation record by using a device identifier of the mobile device in the primary virtual SIM card packet obtaining request as a query basis, obtains a primary virtual SIM card packet allocation record of the mobile device, and obtains a primary virtual SIM card packet in the primary virtual SIM card packet allocation record.

With reference to the second aspect, in some possible implementations, the primary virtual SIM card packet obtaining response is determined by the virtual SIM card server after the virtual SIM card server receives the primary virtual SIM card packet obtaining request, determines at least two primary virtual SIM cards that are in at least two pre-stored primary virtual SIM cards and whose service coverage areas include the visited place, and generates the primary virtual SIM card packet according to the at least two primary virtual SIM cards whose service coverage areas include the visited place.

According to a third aspect, an embodiment of the present invention provides a method for distributing a virtual SIM card, including:

combining, by a virtual SIM card server, N primary virtual SIM cards into M primary virtual SIM card packets according to a preset primary virtual SIM card packet generation policy, where N and M are positive integers, and N is less than M; and sending, to a mobile device, a primary virtual SIM card packet selected from the M primary virtual SIM card packets, where a service coverage area of the primary virtual SIM card packet includes a visited place of the mobile device, and the primary virtual SIM card packet is used by the mobile device to obtain a network environment parameter of the visited place; determining, from the primary virtual SIM card packet, at least two candidate primary virtual SIM cards that match the network environment parameter; and downloading a secondary virtual SIM card by using an accessed primary virtual SIM card that is in the at least two candidate primary virtual SIM cards and that successfully registers with and accesses a network, where the secondary virtual SIM card is used for accessing a target mobile network of the visited place.

It may be learned that, in the method for distributing a virtual SIM card according to this embodiment of the present invention, the virtual SIM card server can combine a same quantity of primary virtual SIM cards into a greater quantity of primary virtual SIM card packets and allocate the primary virtual SIM card packets to more mobile devices in the foregoing primary virtual SIM card packet allocation manner, so that the primary virtual SIM cards are multiplexed, that is, the same quantity of primary virtual SIM cards can be provided for more users. Compared with a prior-art solution that a single primary virtual SIM card can be provided only for a single mobile device, this method helps improve utilization of the primary virtual SIM card and reduce operation costs.

With reference to the third aspect, in some possible implementations, the sending, by a virtual SIM card server to a mobile device, a primary virtual SIM card packet selected from the M primary virtual SIM card packets includes:

receiving, by the virtual SIMA card server, a primary virtual SIM card packet obtaining request sent by the mobile device, where the primary virtual SIM card packet obtaining request carries an area identifier of the visited place; querying the M primary virtual SIM card packets by using the area identifier as a query identifier, and obtaining at least one unallocated primary virtual SIM card packet whose service coverage area includes the visited place; randomly selecting a primary virtual SIM card packet from the at least one primary virtual SIM card packet; and sending, to the mobile device, a primary virtual SIM card packet obtaining response that carries the primary virtual SIM card packet.

With reference to the third aspect, in some possible implementations, the sending, by a virtual SIM card server to a mobile device, a primary virtual SIM card packet selected from the M primary virtual SIM card packets includes:

receiving, by the virtual SIM card server, a primary virtual SIM card packet obtaining request that is sent by the mobile device and that carries a device identifier of the mobile device; querying a pre-stored primary virtual SIM card packet allocation record by using the device identifier as a query basis, and obtaining a primary virtual SIM card packet allocation record of the mobile device; determining a primary virtual SIM card packet in the primary virtual SIM card packet allocation record; and sending, to the mobile device, a primary virtual SIM card packet obtaining response that carries the primary virtual SIM card packet.

With reference to the third aspect, in some possible implementations, service coverage areas of the N primary virtual SIM cards are the same as service coverage areas of the M primary virtual SIM card packets, and the preset primary virtual SIM card packet generation policy is:

a random combination policy based on a restriction that each primary virtual SIM card packet includes at least two primary virtual SIM cards.

With reference to the third aspect, in some possible implementations, service coverage areas of the M primary virtual SIM card packets include a first sub-area and a second sub-area, the N primary virtual SIM cards include a third quantity of primary virtual SIM cards whose service coverage areas are the first sub-area and a fourth quantity of primary virtual SIM cards whose service coverage areas are the second sub-area, and the preset primary virtual SIM card packet generation policy is:

a random combination policy based on a restriction that each primary virtual SIM card packet includes at least two primary virtual SIM cards whose service coverage areas are the first sub-area and at least two primary virtual SIM cards whose service coverage areas are the second sub-area.

According to a fourth aspect, an embodiment of the present invention provides a mobile device. The mobile device includes a functional module, and the functional module is configured to perform some or all steps described in any method according to the first aspect of the embodiments of the present invention.

According to a fifth aspect, an embodiment of the present invention provides a mobile device. The mobile device includes a functional module, and the functional module is configured to perform some or all steps described in any method according to the second aspect of the embodiments of the present invention.

According to a sixth aspect, an embodiment of the present invention provides a virtual SIM card server. The virtual SIM card server includes a functional module, and the functional module is configured to perform some or all steps described in any method according to the third aspect of the embodiments of the present invention.

According to a seventh aspect, an embodiment of the present invention provides a mobile device, including:

a processor, and a memory and a radio frequency circuit that are connected to the processor, where the radio frequency circuit is used for wireless communications.

The memory stores executable program code and at least two primary virtual SIM cards.

The processor is configured to invoke the executable program code stored in the memory, to perform some or all steps described in any method according to the first aspect of the embodiments of the present invention.

According to an eighth aspect, an embodiment of the present invention provides a mobile device, including:

a processor, and a memory and a radio frequency circuit that are connected to the processor, where the radio frequency circuit is used for wireless communications.

The memory stores executable program code.

The processor is configured to invoke the executable program code stored in the memory, to perform some or all steps described in any method according to the second aspect of the embodiments of the present invention.

According to a ninth aspect, an embodiment of the present invention provides a virtual SIM card server, including:

a processor, a memory, a communications interface, and a communications bus.

The memory, the processor, and the communications interface are connected by using the communications bus and communicate with each other by using the communications bus, and the communications interface is used for wireless communications.

The processor invokes the executable program code stored in the memory, to perform some or all steps described in any method according to the third aspect of the embodiments of the present invention.

According to a tenth aspect, an embodiment of the present invention provides a computer readable storage medium. The computer readable storage medium stores program code to be executed by a mobile device, the program code specifically includes an execution instruction, and the execution instruction is used to perform some or all steps described in any method according to the first aspect of the embodiments of the present invention.

According to an eleventh aspect, an embodiment of the present invention provides a computer readable storage medium. The computer readable storage medium stores program code to be executed by a mobile device, the program code specifically includes an execution instruction, and the execution instruction is used to perform some or all steps described in any method according to the second aspect of the embodiments of the present invention.

According to a twelfth aspect, an embodiment of the present invention provides a computer readable storage medium. The computer readable storage medium stores program code to be executed by a virtual SIM card server, the program code specifically includes an execution instruction, and the execution instruction is used to perform some or all steps described in any method according to the third aspect of the embodiments of the present invention.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 4a is a schematic diagram of a correspondence between a primary virtual SIM card packet and a primary virtual SIM card according to an embodiment of the present invention;

FIG. 4b is a schematic diagram of another correspondence between a primary virtual SIM card packet and a primary virtual SIM card according to an embodiment of the present invention;

FIG. 5A and FIG. 5B are a schematic flowchart of another method for accessing a network by using a virtual SIM card according to an embodiment of the present invention;

FIG. 6A and FIG. 6B are a schematic flowchart of another method for accessing a network by using a virtual SIM card according to an embodiment of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

For ease of understanding the embodiments of the present invention, the following first briefly describes some identification information in a mobile communications network.

A mobile country code (Mobile Country Code, MCC) is used to identify a country, and includes three digits. However, multiple MCCs may be allocated to one country, for example, MCCs of the United States of America include 310, 311 and 316, and an MCC of the People's Republic of China includes only 460.

Figure 1:
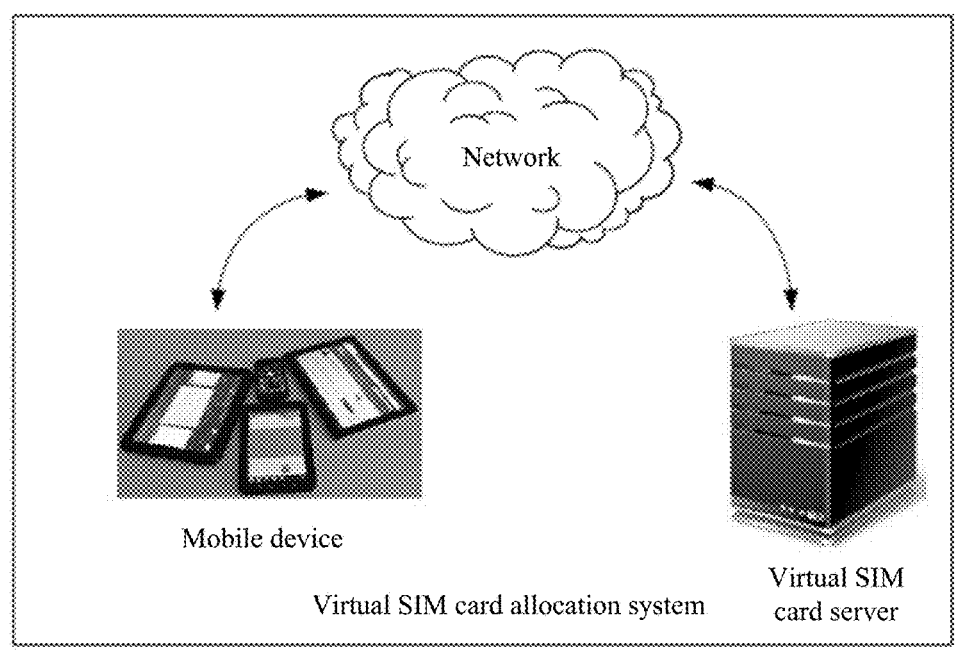
FIG. 1 is a system architecture diagram of a virtual SIM card allocation system used to support a method for accessing a network by using a virtual SIM card according to an embodiment of the present invention.

Referring to FIG. 1, FIG. 1 is a system architecture diagram of a virtual SIM card allocation system used to support a method for accessing a network by using a virtual SIM card according to an embodiment of the present invention. As shown in the figure, the system includes a mobile device, a network, and a virtual SIM card server. The network includes a mobile communications network, and the virtual SIM card server is a service server at an application layer, and is configured to store a primary virtual SIM card packet. The primary virtual SIM card packet is used to store multiple primary virtual SIM cards, and the primary virtual SIM card can support a national-scale network registration service, and have a location discovery function and a capability of providing a basic data network. When entering a visited place, the mobile device may request, by using the primary virtual SIM card, a secondary virtual SIM card that is suitable to be used in the visited place, and access a local mobile network by using the secondary virtual SIM card. The mobile device stores a primary virtual SIM card packet allocated by the virtual SIM card server, and may determine at least two accessed primary virtual cards from the primary virtual SIM card packet according to a network environment parameter obtained from the visited place, download a secondary virtual SIM card by using an accessed primary virtual SIM card that is in the at least two candidate primary virtual SIM cards and that successfully registers with and accesses the network, and then access a target mobile network of the visited place by using the secondary virtual SIM card. The mobile device may be a mobile device with a mobile communications function, such as a terminal, a mobile phone, a tablet computer, a wearable device, a personal digital assistant (Personal Digital Assistant, PDA for short), a point of sale (Point of Sales, POS for short), and an in-vehicle computer, and this is not specifically limited in this embodiment of the present invention.

Figure 2:
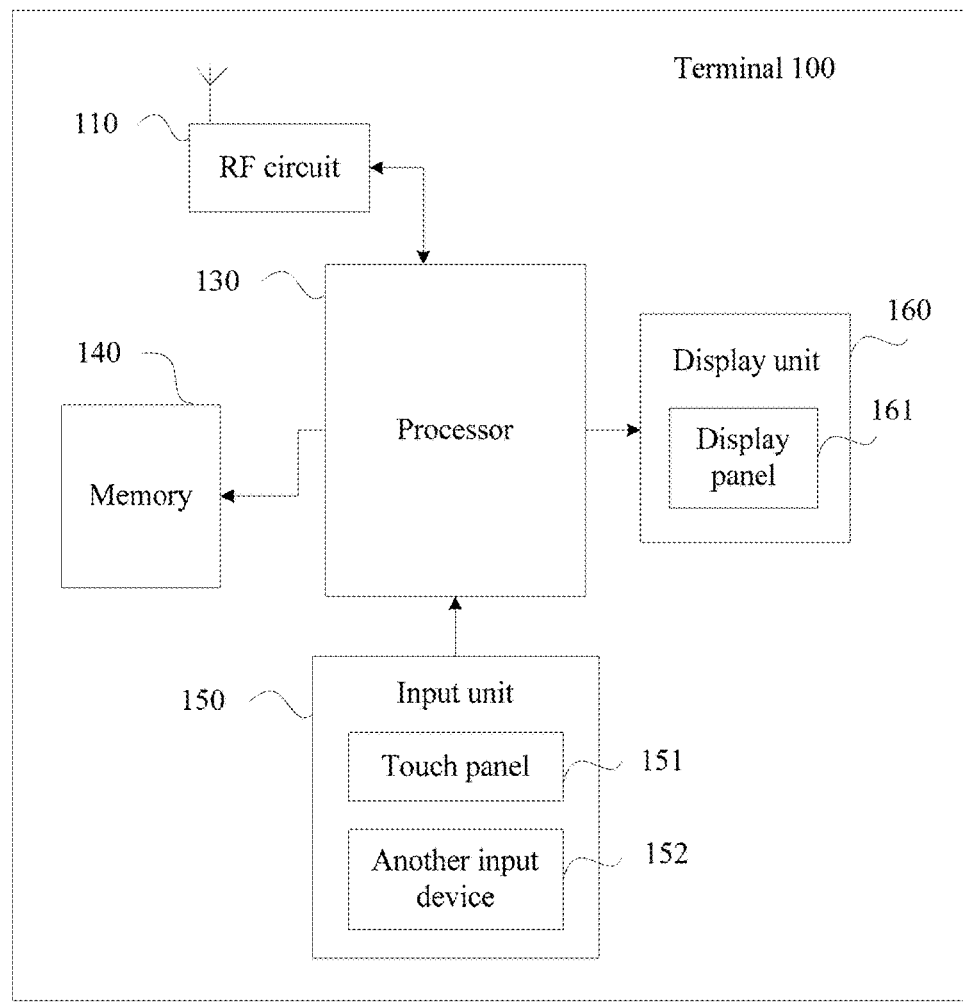
FIG. 2 is a block diagram of a partial structure of a terminal 100 related to an embodiment of the present invention according to an embodiment of the present invention.

For example, the mobile device is a terminal. Referring to FIG. 2, FIG. 2 is a block diagram of a partial structure of a terminal 100 related to an embodiment of the present invention. Referring to FIG. 1.1, the terminal 100 includes parts such as a radio frequency (Radio Frequency, RF) circuit 110, a processor 130, and a memory 140. A person skilled in the art may understand that the terminal structure shown in FIG. 1.1 constitutes no limitation on the terminal, and may include more or fewer parts than those shown in the figure, or combine some parts, or have different part arrangement.

The following specifically describes the components of the terminal 100 with reference to FIG. 2.

The RF circuit 110 may be configured to: receive a primary virtual SIM card packet obtaining response that is sent by a virtual SIM card server and that carries a primary virtual SIM card packet, send the primary virtual SIM card packet obtaining response to the processor 130 for processing, save the primary virtual SIM card packet in the memory 140, and in addition, send data such as a primary virtual SIM card packet obtaining request and a network residence exception message to the virtual SIM card server. Generally, the RF circuit includes but is not limited to an antenna, at least one amplifier, a transceiver, a coupler, a low noise amplifier (Low Noise Amplifier, LNA), a duplexer, and the like. In addition, the RF circuit 110 may further communicate with a network and another device by means of wireless communications. Any communications standard or protocol may be used for the wireless communications and includes but is not limited to the Global System for Mobile Communications (Global System of Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short message service (Short Messaging Service, SMS), and the like.

The memory 140 may be configured to store a software program and a module, and the processor 130 performs various functional applications of the terminal 100 and data processing by running the software program and the module that are stored in the memory 140. The memory 140 may mainly include a program storage area and a data storage area. The program storage area may store an operating system, an application program required by at least one function (for example, a network environment parameter obtaining function, an accessed primary virtual SIM card determining function, a network registration and access function of the primary virtual SIM card, a secondary virtual SIM card downloading function, and a mobile network access function of a secondary virtual SIM card), and the like. The data storage area may store data (for example, the primary virtual SIM card packet, the primary virtual SIM card, and the secondary virtual SIM card) that needs to be used by the terminal 100 or that is created during use of the terminal 100, and the like. In addition, the memory 140 may include a high-speed random access memory, or may further include a nonvolatile memory such as at least one magnetic disk storage component, a flash memory component, or another volatile solid-state storage component.

An input unit 150 may be configured to: receive input digital or character information, and generate key signal input related to user setting and function control of the terminal 100. Specifically, the input unit 150 may include a touch panel 151 and another input device 152. The touch panel 151 is also referred to as a touchscreen, and may collect a touch operation performed by a user on or near the touch panel 151 (such as an operation performed by the user on the touch panel 151 or near the touch panel 151 by using any proper object or accessory, for example, a finger or a stylus), and drive a corresponding connected apparatus according to a preset program. Optionally, the touch panel 151 may include two parts: a touch detection apparatus and a touch controller. The touch detection apparatus detects a touch position of the user, detects a signal caused by the touch operation, and sends the signal to the touch controller. The touch controller receives touch information from the touch detection apparatus, converts the touch information into touch point coordinates, sends the touch point coordinates to the processor 130, and can receive and execute a command sent by the processor 130. In addition, the touch panel 151 may be implemented by using multiple types such as a resistive type, a capacitive type, an infrared ray, and a surface acoustic wave. In addition to the touch panel 151, the input unit 150 may include the another input device 152. Specifically, the another input device 152 may include but is not limited to one or more of a physical keyboard, a function key (such as a volume control key or an on/off key), a trackball, a mouse, a joystick, or the like.

The display unit 160 may be configured to display information input by the user or information provided for the user, and various menus of the terminal 100. The display unit 160 may include a display panel 161, and optionally, the display panel 161 may be configured by using an LCD, an OLED, or the like. Further, the touch panel 151 may cover the display panel 161. After detecting the touch operation on or near the touch panel 151, the touch panel 151 transfers the touch operation on to the processor 130 to determine a touch event type, and then the processor 130 provides corresponding visual output on the display panel 161 according to the touch event type. Although the touch panel 151 and the display panel 151 in FIG. 1.1 are used as two independent parts to implement input and input functions of the terminal 100, in some embodiments, the touch panel 151 and the display panel 161 may be integrated to implement the input and output functions of the terminal 100.

The processor 130 is a control center of the terminal 100, connects to various parts of the entire terminal by using various interfaces and lines, and performs various functions of the terminal 100 and data processing by running or executing the software program and/or the module stored in the memory 140 and by invoking data stored in the memory 140, so as to implement multiple terminal-based services. Optionally, the processor 130 may include one or more processing units. Preferably, the processor 130 may integrate an application processor and a modem processor. The application processor mainly processes the operating system, a user interface, the application program, and the like. The modem processor mainly processes wireless communications. It may be understood that the foregoing modem processor may not be integrated into the processor 130.

In specific implementation, the processor 130 in the terminal 100 performs, by invoking executable program code (for example, the foregoing software program and/or the module) in the memory 140 and the data stored in the memory 140, the following method for accessing a network by using a virtual SIM card.

The processor 130 in the terminal 100 determines, from the at least two primary virtual SIM cards, at least two candidate primary virtual SIM cards that match a network environment parameter of a visited place of the terminal 100.

The processor 130 in the terminal 100 downloads a secondary virtual SIM card by using an accessed primary virtual SIM card that is in the at least two candidate primary virtual SIM cards and that successfully registers with and accesses a network.

The processor 130 in the terminal 100 accesses a target mobile network of the visited place by using the secondary virtual SIM card.

Alternatively, the processor 130 in the terminal 100 further executes, by invoking the software program and/or the module in the memory 140 and data stored in the memory 140, the following method for accessing a network by using a virtual SIM card.

The processor 130 in the terminal 100 determines, from a pre-stored primary virtual SIM card packet, at least two candidate primary virtual SIM cards that match a network environment parameter of a visited place of the terminal 100. A service coverage area of the primary virtual SIM card packet includes the visited place.

The processor 130 in the terminal 100 downloads a secondary virtual SIM card by using an accessed primary virtual SIM card that is in the at least two candidate primary virtual SIM cards and that successfully registers with and accesses a network.

The processor 130 in the terminal 100 accesses a target mobile network of the visited place by using the secondary virtual SIM card.

It may be learned that, in an existing solution, the virtual SIM card server sends a single primary virtual SIM card to the mobile device, and by contrast, in the method for accessing a network by using a virtual SIM card according to this embodiment of the present invention, a situation in which the target mobile network of the visited place cannot be accessed because the single primary virtual SIM card fails to reside in the network can be avoided. Therefore, a network access success rate and network access reliability of the mobile device are improved, and user experience is improved.

Figure 3:
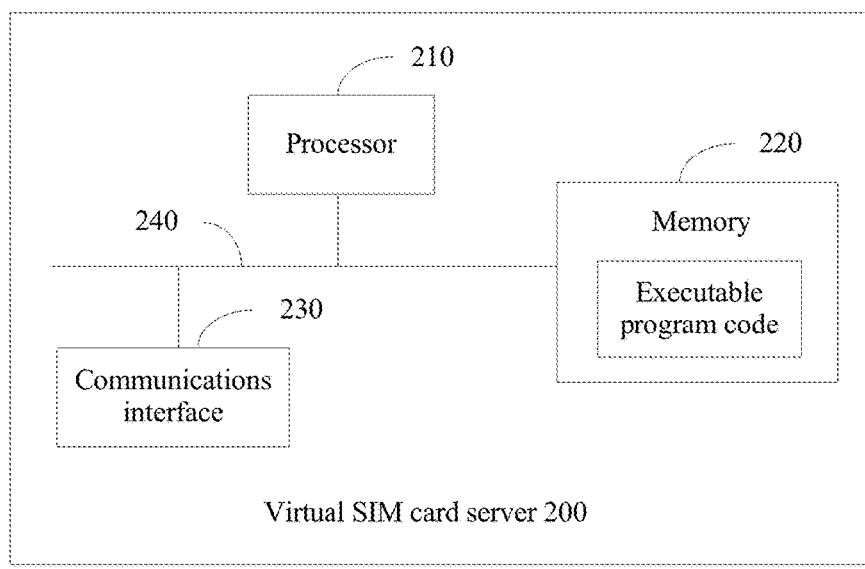
FIG. 3 is an architecture composition block diagram of a virtual SIM card server 200 according to an embodiment of the present invention.

Referring to FIG. 3, FIG. 3 is an architecture composition block diagram of a virtual SIM card server 200 according to an embodiment of the present invention. Referring to FIG. 3, the virtual SIM card server 200 includes a processor 210, a memory 220, a communications interface 230, and a communications bus 240. The memory 220, the processor 210, and the communications interface 230 are connected by using the communications bus 250 and communicate with each other by using the communications bus 250, and the communications interface 230 is used for wireless communications. A person skilled in the art may understand that a virtual SIM card server structure shown in FIG. 3 constitutes no limitation on the virtual SIM card server, and may include more or fewer parts than those shown in the figure, or combine some parts, or have different part arrangement.

The processor 210 may be a central processing unit CPU, a microprocessor, an application-specific integrated circuit (application-specific integrated circuit, ASIC), or one or more integrated circuits configured to control execution of this technical solution. The communications bus 250 may include a path through which information is transmitted between the foregoing components. The memory 220 may be a read-only memory (read-only memory, ROM), or another type of static storage device that can store static information and a static instruction, or a random access memory (random access memory, RAM), or another type of dynamic storage device that can store information and an instruction; or may be an electrically erasable programmable read-only memory (Electrically Erasable Programmable Read-Only Memory, EEPROM), a compact disc read-only memory (Compact Disc Read-Only Memory, CD-ROM) or another optical disk storage or optical disc storage (including a compact disc, a laser disc, an optical disc, a digital versatile disc, a Blu-ray disc, and the like), a disk storage medium or another magnetic storage device, or any other medium that can be used to carry or store expected program code in a form of an instruction or a data structure and that can be accessed by a computer. However, this is not limited herein. The communications interface 230 may be configured to receive and send a signal in an information receiving and sending process. Generally, the communications interface 230 may include but is not limited to an antenna, at least one amplifier, a transceiver, a coupler, an LNA (Low Noise Amplifier, low noise amplifier), a duplexer, and the like. In addition, the communications interface 230 may further communicate with a network or another device by means of wireless communications. Any communications standard or protocol may be used for the wireless communications and includes but is not limited to the GSM, a GPRS, CDMA, WCDMA, LTE, an email, an SMS, and the like.

The processor 210 in the virtual SIM card server 200 performs, by invoking executable program code stored in the memory 220, the following method for accessing a network by using a virtual SIM card.

The processor 210 in the virtual SIM card server 200 combines N primary virtual SIM cards into M primary virtual SIM card packets according to a preset primary virtual SIM card packet generation policy. N and M are positive integers, and N is less than M. The N primary virtual SIM cards are sent by an operator server.

The processor 210 in the virtual SIM card server 200 sends, to a mobile device by using the communications interface 230, a primary virtual SIM card packet selected from the M primary virtual SIM card packets, where a service coverage area of the primary virtual SIM card packet includes a visited place of the mobile device, and the primary virtual SIM card packet is used by the mobile device to obtain a network environment parameter of the visited place; determines, from the primary virtual SIM card packet, at least two candidate primary virtual SIM cards that match the network environment parameter; and downloads a secondary virtual SIM card by using an accessed primary virtual SIM card that is in the at least two candidate primary virtual SIM cards and that successfully registers with and accesses a network, where the secondary virtual SIM card is used for accessing a target mobile network of the visited place.

It may be learned that, in the method for accessing a network by using a virtual SIM card according to this embodiment of the present invention, the virtual SIM card server can combine a same quantity of primary virtual SIM cards into a greater quantity of primary virtual SIM card packets and allocate the primary virtual SIM card packets to more mobile devices in the foregoing primary virtual SIM card packet allocation manner, so that the primary virtual SIM cards are multiplexed, that is, the same quantity of primary virtual SIM cards can be provided for more users. Compared with a prior-art solution that a single primary virtual SIM card can be provided only for a single mobile device, this method helps improve utilization of the primary virtual SIM card and reduce operation costs.

Figure 4A:
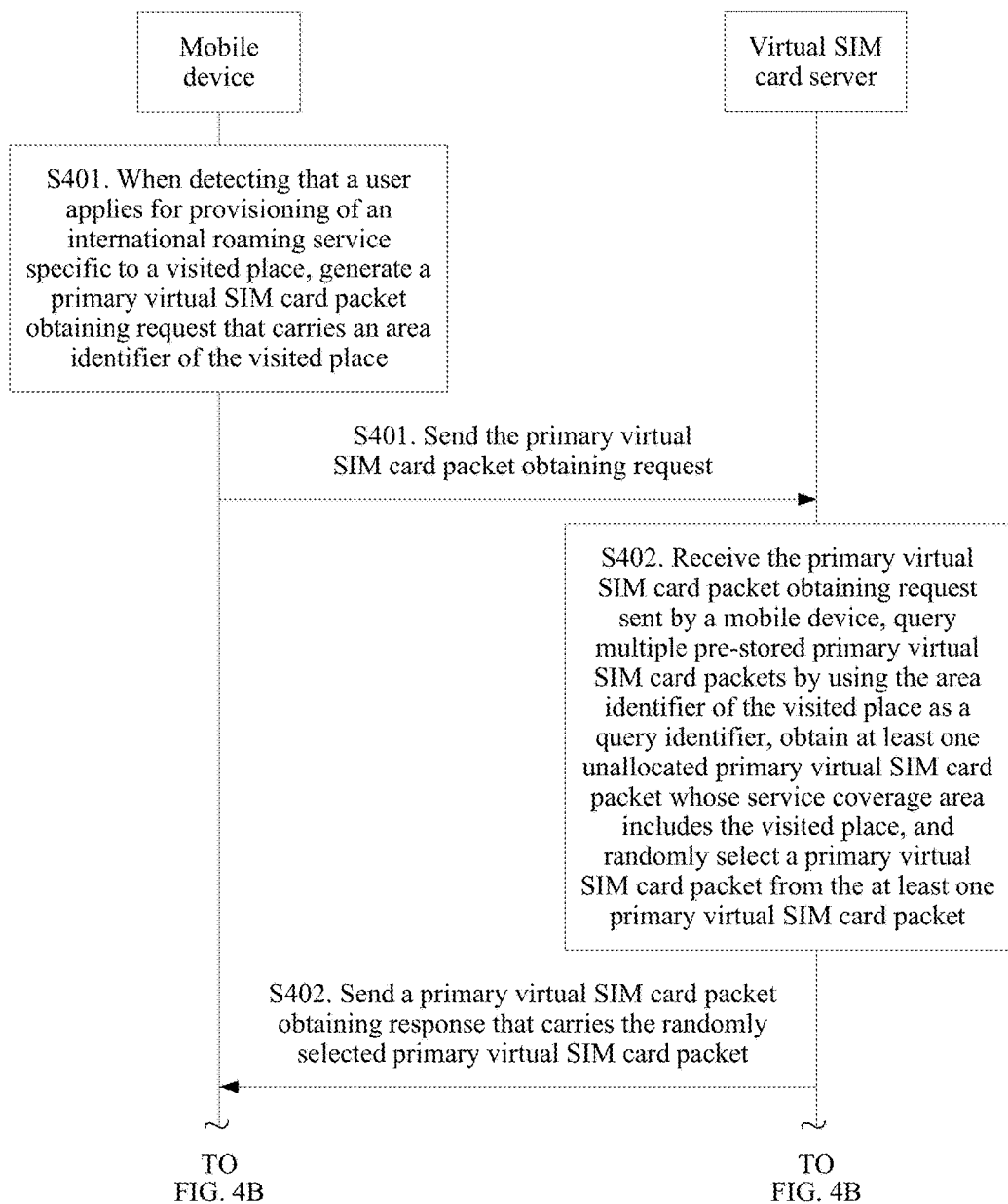
FIG. 4A and FIG. 4B are a schematic flowchart of a method for accessing a network by using a virtual SIM card according to an embodiment of the present invention.
Figure 4B:
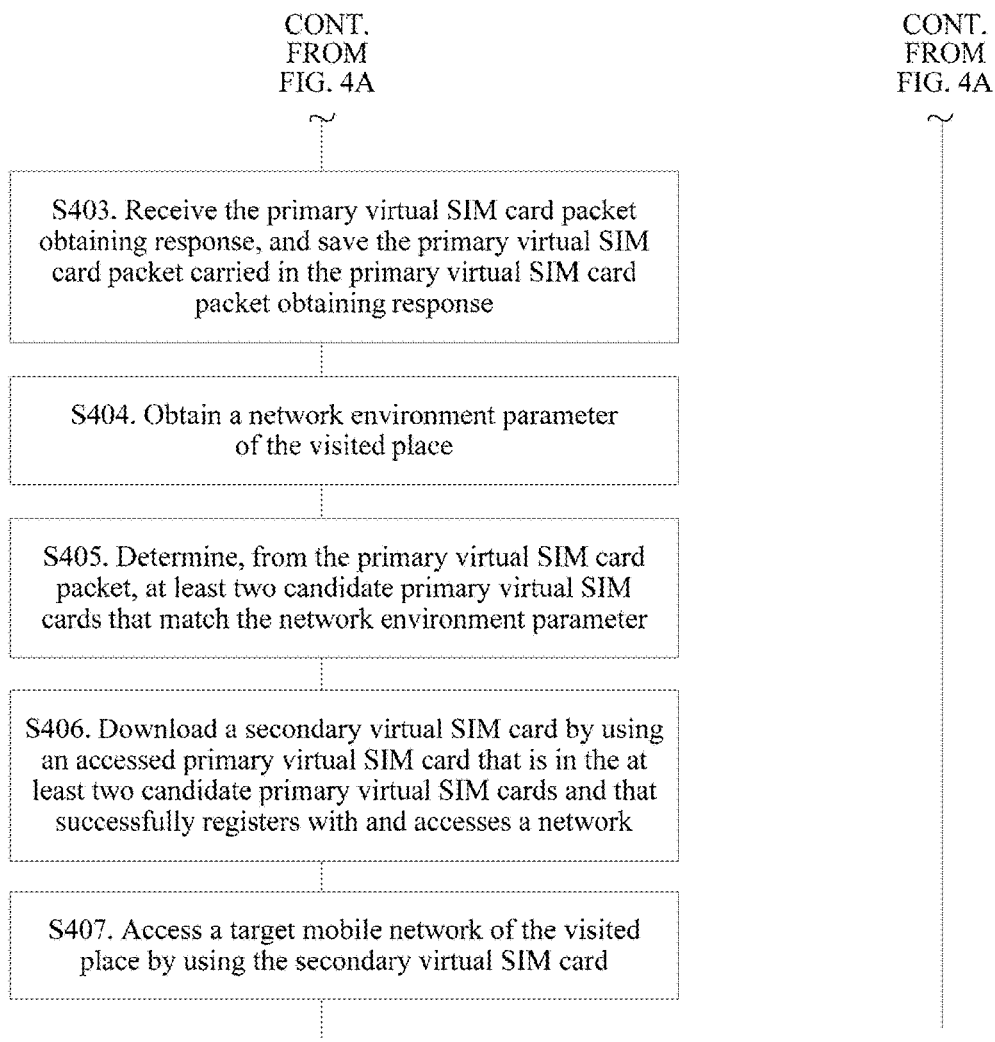
Figure 4A:
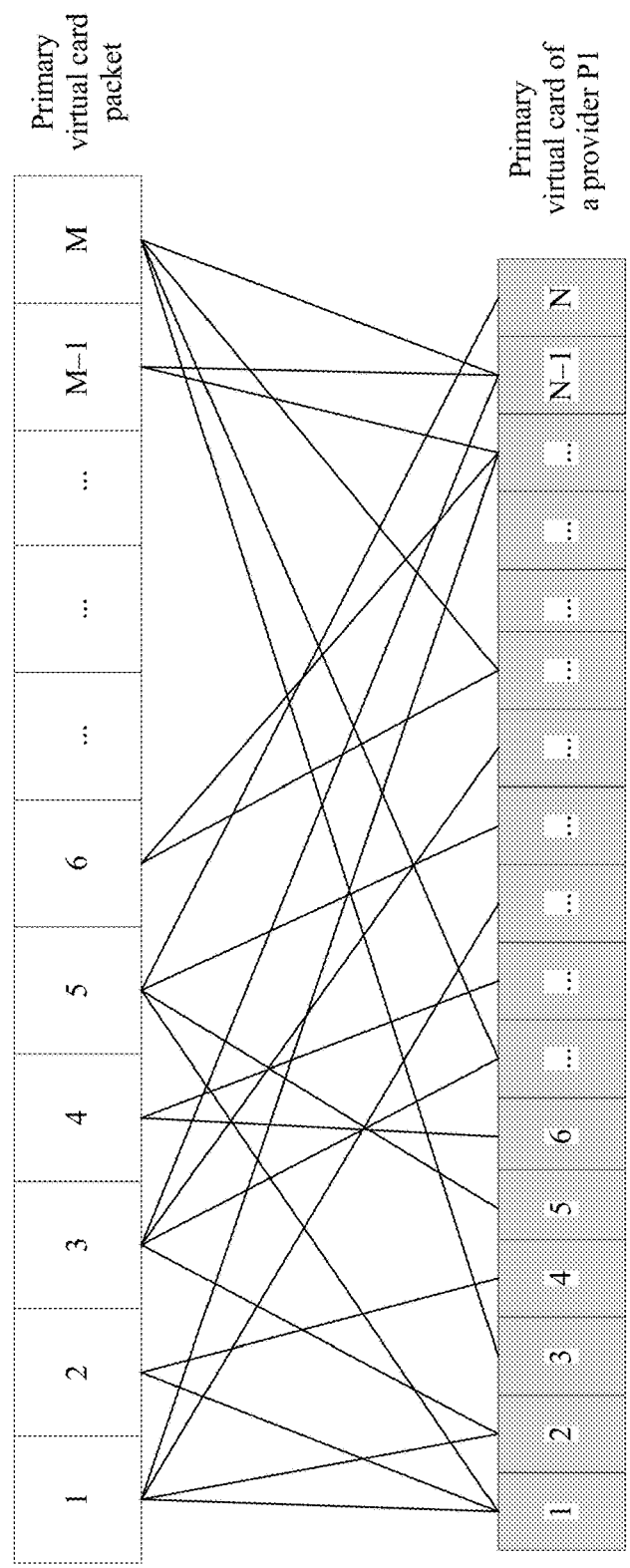
Figure 4B:
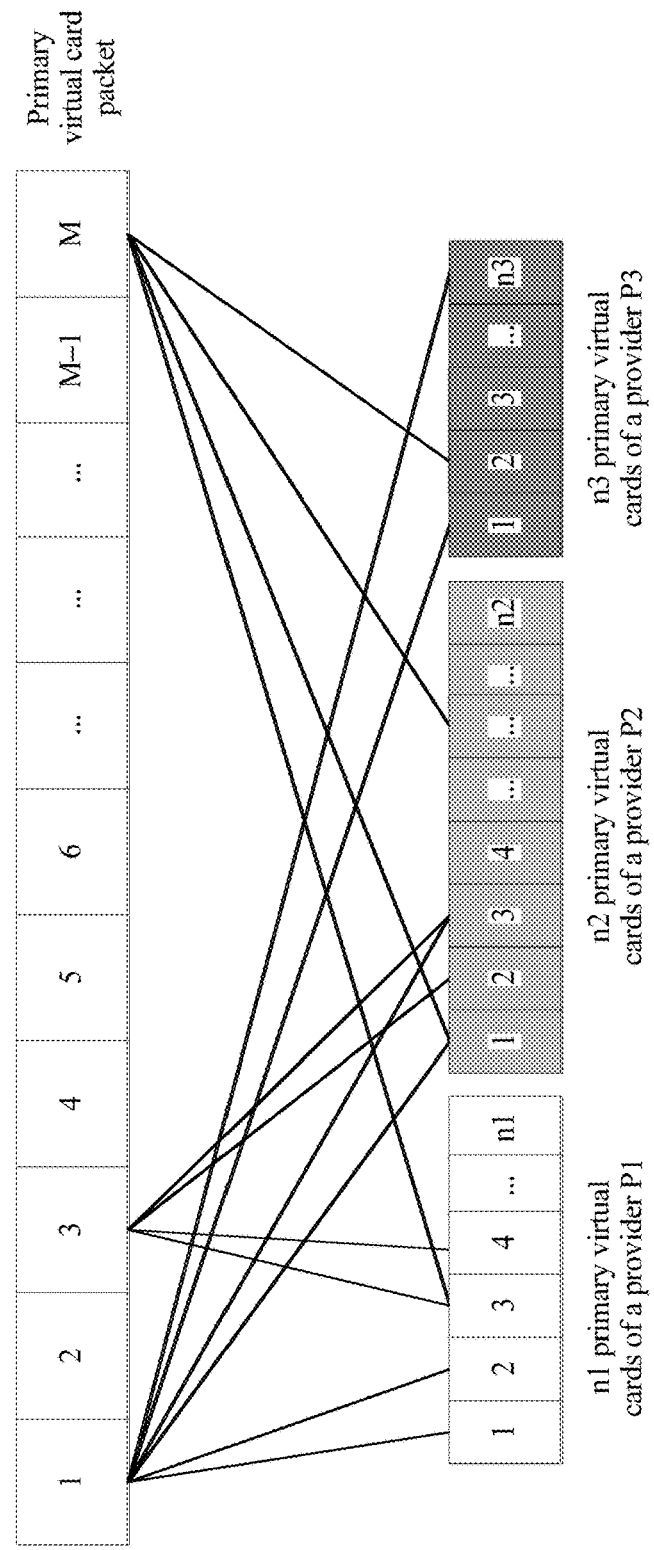

Same as the foregoing technical solution, FIG. 4A and FIG. 4B are a schematic flowchart of a method for accessing a network by using a virtual SIM card according to an embodiment of the present invention. As shown in FIG. 4A and FIG. 4B, the method for accessing a network by using a virtual SIM card disclosed in this method embodiment of the present invention specifically includes the following steps.

S401. A mobile device generates a primary virtual SIM card packet obtaining request that carries an area identifier of the visited place, and sends the primary virtual SIM card packet obtaining request to a virtual SIM card server.

When detecting that a user applies for provisioning of an international roaming service specific to the visited place, the mobile device generates, according to the application of the user, the primary virtual SIM card packet obtaining request that carries the area identifier of the visited place.

For example, the visited place may be a country or a region.

S402. The virtual SIM card server receives the primary virtual SIM card packet obtaining request sent by the mobile device, queries multiple pre-stored primary virtual SIM card packets by using the area identifier of the visited place as a query identifier, obtains at least one unallocated primary virtual SIM card packet whose service coverage area includes the visited place, randomly selects a primary virtual SIM card packet from the at least one primary virtual SIM card packet, and sends, to the mobile device, a primary virtual SIM card packet obtaining response that carries the randomly selected primary virtual SIM card packet.

The multiple pre-stored primary virtual SIM card packets may be obtained by the virtual SIM card server by combining multiple primary virtual SIM cards according to a preset card packet generation policy. The multiple primary virtual SIM cards may be customized by an operator for the virtual SIM card server, and each of the multiple pre-stored primary virtual SIM card packets includes at least two primary virtual SIM cards.

In specific implementation, an example of a data structure of the primary virtual SIM card stored in the virtual SIM card server may be shown in Table 1.

TABLE 1

| Primary card identifier of a primary virtual SIM card | Virtual SIM card parameter list | Network number set of supported networks | Provider | Provider quality weight |
| --- | --- | --- | --- | --- |
| I00001 | {"param1": "param1value", ...} | [45401, 45402, ...] | P1 | 1 |
| I00002 | {"param1": "param1value", ...} | [45401, 45402, ...] | P1 | 1 |
| I00003 | {"param1": "param1value", ...} | [45401, 45402, ...] | P1 | 1 |
| ... | {"param1": "param1value", ...} | [45403, 45404, ...] | P2 | 2 |
| I10000 | {"param1": "param1value", ...} | [45403, 45404, ...] | P2 | 2 |

As shown in Table 1, the primary virtual SIM card may specifically include parameters such as the primary card identifier of the primary virtual SIM card, the network number set of the supported networks, the provider, and the provider quality weight. The network number set of the supported networks may be used to represent a service coverage area of the primary virtual SIM card, and for example, a service coverage area of a primary virtual SIM card that is in Table 1 and whose primary card identifier is I00001 may be represented by a corresponding network number set [45401, 45402, . . . ]. The area identifier of the visited place may be corresponding to a network number of a network supported by the visited place, and for example, if the visited place supports a network whose network number is 45401 in Table 1, the network number 45401 may be used to represent the area identifier of the visited place. The provider quality weight is used to indicate communication quality of a network supported by a corresponding primary virtual SIM card, and a smaller provider quality weight value indicates better communication quality of a corresponding network.

It should be noted that there may be various preset card packet generation policies, and this is not uniquely limited in this embodiment of the present invention.

For example, when the multiple primary virtual SIM cards are customized by a same operator for the virtual SIM card server and service coverage areas of all the primary virtual SIM cards are the same, the preset card packet generation policy may be a random combination policy based on a restriction that each primary virtual SIM card packet includes at least two primary virtual SIM cards. With reference to a schematic diagram, shown in FIG. 4a, of a correspondence between a primary virtual SIM card packet and a primary virtual SIM card, it may be learned that a primary virtual SIM card packet 1 includes a primary virtual SIM card 1 and a primary virtual SIM card 2.

For another example, when the multiple primary virtual SIM cards are customized by at least two operators for the virtual SIM card server and service coverage areas of all the primary virtual SIM cards are the same, the preset card packet generation policy may still be a random allocation policy based on a restriction that each primary virtual SIM card packet includes at least two primary virtual SIM cards. With reference to a schematic diagram, shown in FIG. 4a, of a correspondence between a primary virtual SIM card packet and a primary virtual SIM card, it may be learned that a primary virtual SIM card packet 1 includes a primary virtual SIM card 1 and a primary virtual SIM card 2.

For another example, when the multiple primary virtual SIM cards are customized by at least two operators for the virtual SIM card server and service coverage areas of primary virtual SIM cards provided by all the operators are different, the preset card packet generation policy may be a random combination policy based on a restriction that a service coverage area of the primary virtual SIM card packet is a global service coverage area, that is, service coverage areas of primary virtual SIM cards in each generated primary virtual SIM card packet are overlapped to form the global service coverage area. FIG. 4b is a schematic diagram of another correspondence between a primary virtual SIM card packet and a primary virtual SIM card. N primary virtual SIM cards include n1 primary virtual SIM cards of a provider P1, n2 primary virtual SIM cards of a provider P2, and n3 primary virtual SIM cards of a provider P3. A service coverage area of the primary virtual SIM cards of the provider P1 is an area 1, a service coverage area of the primary virtual SIM cards of the provider P2 is an area 2, a service coverage area of the primary virtual SIM cards of the provider P3 is an area 3, and a global service coverage area is obtained by overlapping the area 1, the area 2, and the area 3. It may be learned with reference to FIG. 4b that the primary virtual SIM card packet needs to include at least two primary virtual SIM cards of the provider P1, at least two primary virtual SIM cards of the provider P2, and at least two primary virtual SIM cards of the provider P3. For example, a primary virtual SIM card packet 1 includes a primary virtual SIM card 1 and a primary virtual SIM card 2 of the provider P1, a primary virtual SIM card 1 and a primary virtual SIM card 3 of the provider P2, and a primary virtual SIM card 1 and a primary virtual SIM card n3 of the provider P3.

In specific implementation, an example of a data structure of an allocation relationship between the primary virtual SIM card packet and the primary virtual SIM card in the virtual SIM card server may be shown in Table 2.

TABLE 2

| Primary card packet identifier of a primary virtual SIM card packet | Primary card identifier of an included primary virtual SIM card |
| --- | --- |
| P00001 | I00001, I00021, I00033, I05595 |
| P00002 | I05438, I01021, I02307, I08086 |
| P00003 | I00801, I00021, I00907, I05595, I04479, 03587 |
| P00004 | I07263, I04072, I00006, I05595, I08185, ..., I00057 |
| ... | ... |
| I300000 | I05186, I07265, I06359, I00591, I09155, ..., I07296 |

As shown in Table 2, each primary virtual SIM card packet generated by the virtual SIM card server includes at least two primary virtual SIM cards. Multiple primary virtual SIM card packets generated by the virtual SIM card server may multiplex a same primary virtual SIM card. For example, primary virtual SIM card packets P00001, P00002, and P00003 shown in Table 2 multiplex a primary virtual SIM card I00021, and primary virtual SIM card packets P00001, P00003, and P00004 multiplex a primary virtual SIM card I05595.

In specific implementation, an example of a data structure of an allocation relationship that is stored at a virtual SIM card server side and that is between a mobile device and a primary virtual SIM card packet is shown in Table 3.

TABLE 3

| Device identifier of a mobile device | Primary card packet identifier of a primary virtual SIM card packet | Allocation time |
| --- | --- | --- |
| D100001 | P00001 | 12:00:00, Apr. 1, 2016 |
| D100002 | P00002 | 12:00:00, Apr. 1, 2016 |
| D100003 | P00003 | 12:00:00, Apr. 1, 2016 |
| D100004 | P00004 | 12:00:00, Apr. 1, 2016 |

As shown in Table 3, a primary card packet identifier of a primary virtual SIM card packet allocated by the virtual SIM card server to a mobile device whose device identifier is D100001 is P00001, that is, the virtual SIM card server may determine, according to an area identifier of a visited place of the mobile device D100001, that a service coverage area of the primary virtual SIM card packet P00001 includes the visited place of the mobile device D100001, so as to establish a data record shown in the first row of Table 1.

S403. The mobile device receives the primary virtual SIM card packet obtaining response, and saves the primary virtual SIM card packet carried in the primary virtual SIM card packet obtaining response.

In specific implementation, an example of a data structure of the primary virtual SIM card packet stored in the mobile device is shown in Table 4.

TABLE 4

| Primary card packet identifier of a primary virtual SIM card packet | Primary card identifier of a primary virtual SIM card | Network number set of supported networks | Provider quality weight | Virtual SIM card parameter list |
| --- | --- | --- | --- | --- |
| P00001 | I00001 | [45401, 45402, ...] | 1 | {"param1": "param1value", ...} |
| P00001 | I00021 | [45401, 45402, ...] | 1 | {"param1": "param1value", ...} |
| P00001 | I00033 | [45401, 45402, ...] | 1 | {"param1": "param1value", ...} |
| P00001 | I05595 | [45403, 45404, ...] | 2 | {"param1": "param1value", ...} |

As shown in Table 4, the primary virtual SIM card packet includes at least two primary virtual SIM cards. For example, the area identifier of the visited place of the mobile device is 45401, and an example of the primary virtual SIM card packet includes at least three primary virtual SIM cards whose service coverage areas include the visited place: a primary virtual SIM card I00001, a primary virtual SIM card I00021, and a primary virtual SIM card I00033.

S404. The mobile device obtains a network environment parameter of the visited place.

In specific implementation, the network environment parameter includes a network number of a mobile network found by the mobile device in the visited place, and the mobile device may obtain the network environment parameter when detecting that the mobile device is in the visited place, or may obtain the network environment parameter when detecting a network access setting instruction of the user. A triggering condition of obtaining the network environment parameter by the mobile device is not uniquely limited in this embodiment of the present invention.

S405. The mobile device determines, from the primary virtual SIM card packet, at least two candidate primary virtual SIM cards that match the network environment parameter.

It may be understood that the mobile device may determine, from the primary virtual SIM card packet in various implementations, the at least two candidate primary virtual SIM cards that match the network environment parameter.

In an embodiment, the mobile device determines, from the primary virtual SIM card packet in the following implementation, the at least two candidate primary virtual SIM cards that match the network environment parameter.

The mobile device queries, by using the network number of the mobile network found in the visited place as a query identifier, a network number set of networks supported by primary virtual SIM cards in the primary virtual SIM card packet, and determines at least two network number sets including the network number and at least two candidate primary virtual SIM cards corresponding to the at least two network number sets.

The network number of the mobile network found in the visited place includes a network number of a network with which a physical subscriber identity module SIM card of the mobile device currently registers.

In another embodiment, the mobile device determines, from the primary virtual SIM card packet in the following implementation, the at least two candidate primary virtual SIM cards that match the network environment parameter.

The mobile device extracts a mobile country code MCC from the network number of the mobile network found in the visited place.

The mobile device queries, by using the MCC as a query identifier, a network number set of networks supported by primary virtual SIM cards in the primary virtual SIM card packet, and determines at least two network number sets including the network number and at least two candidate primary virtual SIM cards corresponding to the at least two network number sets.

Figure 4C:
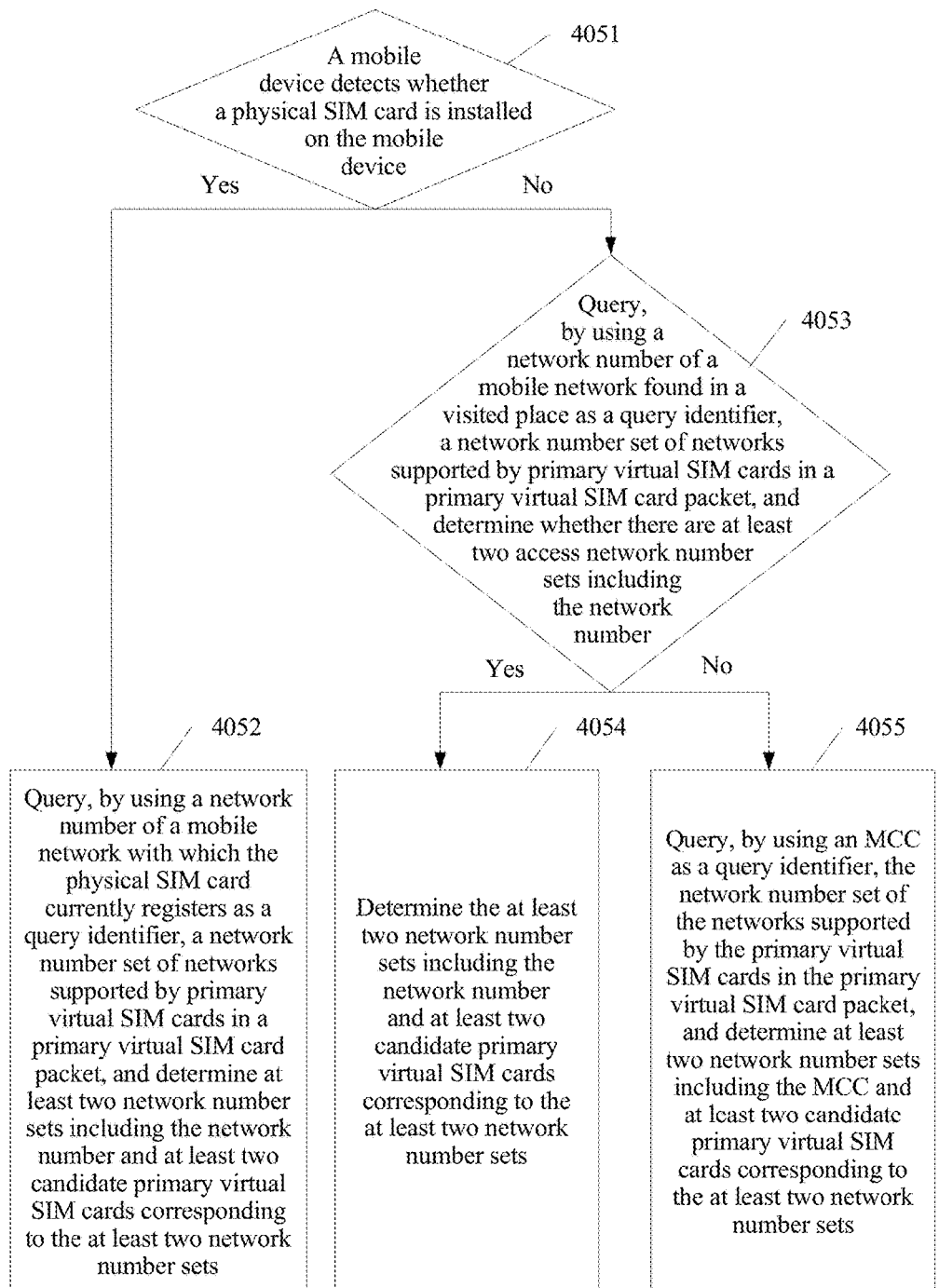
FIG. 4c is a schematic diagram of a process of selecting a primary virtual SIM card when a mobile device has a physical SIM card according to an embodiment of the present invention.

Further, with reference to a schematic diagram, shown in FIG. 4c, of a process of selecting a primary virtual SIM card when a mobile device has a physical SIM card, the mobile device may select the at least two candidate primary virtual SIM cards from the primary virtual SIM card packet by combining selection methods in the foregoing two embodiments. As shown in FIG. 4c, the process includes the following steps.

S4051. The mobile device detects whether a physical SIM card is installed on the mobile device.

S4052. If yes, query, by using a network number of a mobile network with which the physical SIM card currently registers as a query identifier, a network number set of networks supported by primary virtual SIM cards in a primary virtual SIM card packet, and determine at least two network number sets including the network number and at least two candidate primary virtual SIM cards corresponding to the at least two network number sets.

S4053. If no, query, by using the network number of the mobile network found in the visited place as a query identifier, a network number set of networks supported by primary virtual SIM cards in a primary virtual SIM card packet, and determine whether there are at least two access network number sets including the network number.

S4054. If yes, determine the at least two network number sets including the network number and at least two candidate primary virtual SIM cards corresponding to the at least two network number sets.

S4055. If no, query, by using the MCC as a query identifier, the network number set of the networks supported by the primary virtual SIM cards in the primary virtual SIM card packet, and determine at least two network number sets including the MCC and at least two candidate primary virtual SIM cards corresponding to the at least two network number sets.

S406. The mobile device downloads a secondary virtual SIM card by using an accessed primary virtual SIM card that is in the at least two candidate primary virtual SIM cards and that successfully registers with and accesses a network.

In specific implementation, when the at least two candidate primary virtual SIM cards include provider quality weights, a specific implementation of downloading the secondary virtual SIM card by using the accessed primary virtual SIM card that is in the at least two candidate primary virtual SIM cards and that successfully registers with and accesses the network is as follows:

The mobile device registers with and accesses the network in ascending order of the provider quality weights by using the at least two candidate primary virtual SIM cards, determines an accessed primary virtual SIM card that can successfully register with and access the network, and downloads the secondary virtual SIM card by using the accessed primary virtual SIM card to access the network.

In specific implementation, the mobile device sequentially performs a network registration and access operation by using each candidate primary virtual SIM card in ascending order of the provider quality weights until the mobile device finds the accessed primary virtual SIM card that successfully registers with and accesses the network, and once the accessed primary virtual SIM card successfully registers with and accesses the network, network registration and access does not need to be performed any longer. If the mobile device detects that the network is disconnected, the mobile device may continue to search for a proper primary card in this manner.

For example, it is assumed that the at least two candidate primary virtual SIM cards include a candidate primary virtual SIM card 1 and a candidate primary virtual SIM card 2, provider quality weights of the candidate primary virtual SIM card 1 and the candidate primary virtual SIM card 2 are respectively 1 and 2, and the mobile device has accessed the target mobile network of the visited place. When the mobile device detects that the mobile device is disconnected from the target mobile network and a secondary virtual SIM card that is stored on the mobile device and that is used for accessing the target mobile network is deleted, the mobile terminal may first perform a network registration and access operation by using the candidate primary virtual SIM card 1. If network registration and access fails, the mobile device then performs a network registration and access operation by using the candidate primary virtual SIM card 2. If network registration and access succeeds, the candidate primary virtual SIM card 2 is the accessed primary virtual SIM card, and the mobile device re-downloads a secondary virtual SIM card by using the accessed primary virtual SIM card, and accesses the target mobile network again by using the downloaded secondary virtual SIM card.

The accessed primary virtual SIM card may register with and access a network that is the same as or different from the target mobile network, and this is not uniquely limited in this embodiment of the present invention.

S407. The mobile device accesses the target mobile network of the visited place by using the secondary virtual SIM card.

Figure 4D:
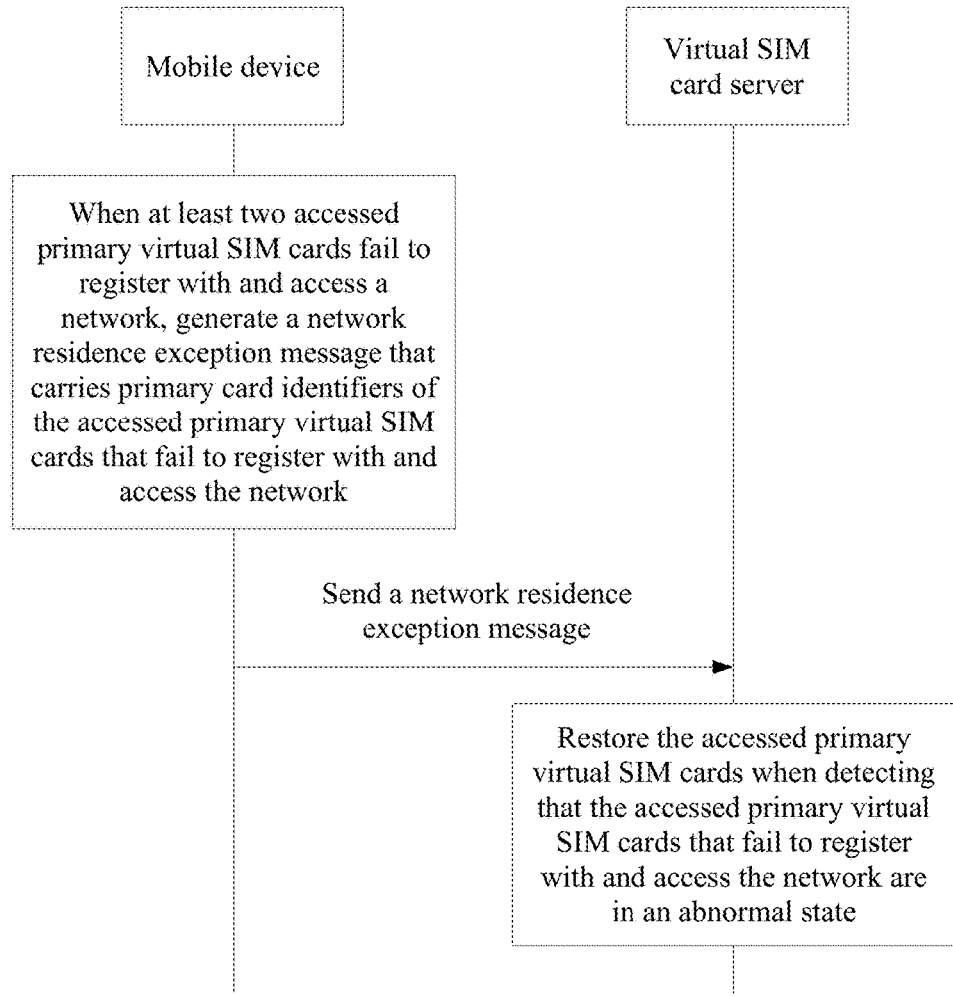
FIG. 4d is a flowchart of processing a network registration and access exception according to an embodiment of the present invention.

Optionally, in this embodiment of the present invention, with reference to a flowchart, shown in FIG. 4d, of processing a network registration and access exception, a process of interaction between the mobile device and the virtual SIM card server includes the following content:

When the mobile device fails to register with and access the network by using the at least two candidate primary virtual SIM cards, the mobile device generates a network residence exception message that carries a primary card identifier of the accessed primary virtual SIM card that fails to register with and access the network.

The mobile device sends the network residence exception message to the virtual SIM card server.

The virtual SIM card server receives the network residence exception message, and restores the accessed primary virtual SIM card when detecting that the accessed primary virtual SIM card that fails to register with and access the network is in an abnormal state.

In specific implementation, an example of a data structure for processing the network residence exception message by the virtual SIM card server is shown in Table 5.

TABLE 5

| Primary card identifier of a primary virtual SIM card | Conflict time | State |
|---|---|---|
| I00801 | 12:07:52, Apr. 2, 2016 | Unprocessed |
| I01006 | 12:07:52, Apr. 2, 2016 | Processed |

It may be learned from the example of the data structure shown in Table 5 that, after receiving the network residence exception message, the virtual SIM card server may process this exception event synchronously, or may process this exception event asynchronously.

Optionally, in this embodiment of the present invention, the service coverage area of the primary virtual SIM card packet includes multiple service coverage sub-areas. Correspondingly, the primary virtual SIM card packet includes the at least two primary virtual SIM cards, the at least two primary virtual SIM cards include multiple primary virtual SIM card subsets corresponding to the multiple service coverage sub-areas, and each primary virtual SIM card subset includes at least two primary virtual SIM cards.

For example, it is assumed that an operator releases a global package service, and a service coverage area of the global package service specifically includes 100 countries in Asia, Europe, Africa, America, and Oceania. Specifically, the 100 countries are 25 countries in Asia, 20 countries in Europe, 15 countries in Africa, 20 countries in America, and 20 countries in Oceania, and currently, there are 5 operators: an operator 1, an operator 2, an operator 3, an operator 4, and an operator 5. A service coverage area of a type-A primary virtual SIM card provided by the operator 1 includes the 25 countries in Asia, a service coverage area of a type-B primary virtual SIM card provided by the operator 2 includes the 20 countries in Europe, a service coverage area of a type-C primary virtual SIM card provided by the operator 3 includes the 15 countries in Africa, a service coverage area of a type-D primary virtual SIM card provided by the operator 4 includes the 20 countries in America, and a service coverage area of a type-E primary virtual SIM card provided by the operator 5 includes the 20 countries in America. In this case, a primary virtual SIM card packet that supports the global package service at least needs to include two type-A primary virtual SIM cards, two type-B primary virtual SIM cards, two type-C primary virtual SIM cards, two type-D primary virtual SIM cards, and two type-E primary virtual SIM cards.

It may be learned that, in an existing solution, the virtual SIM card server sends a single primary virtual SIM card to the mobile device, and by contrast, in the method for accessing a network by using a virtual SIM card according to this embodiment of the present invention, a situation in which the target mobile network of the visited place cannot be accessed because the single primary virtual SIM card fails to reside in the network can be avoided. Therefore, a network access success rate and network access reliability of the mobile device are improved, and user experience is improved.

In addition, the virtual SIM card server can combine a same quantity of primary virtual SIM cards into a greater quantity of primary virtual SIM card packets and allocate the primary virtual SIM card packets to more mobile devices in the foregoing primary virtual SIM card packet allocation manner, so that the primary virtual SIM cards are multiplexed, that is, the same quantity of primary virtual SIM cards can be provided for more users. Compared with a prior-art solution that the single primary virtual SIM card can be provided only for a single mobile device, this method helps improve utilization of the primary virtual SIM card and reduce operation costs.

Figure 5A:
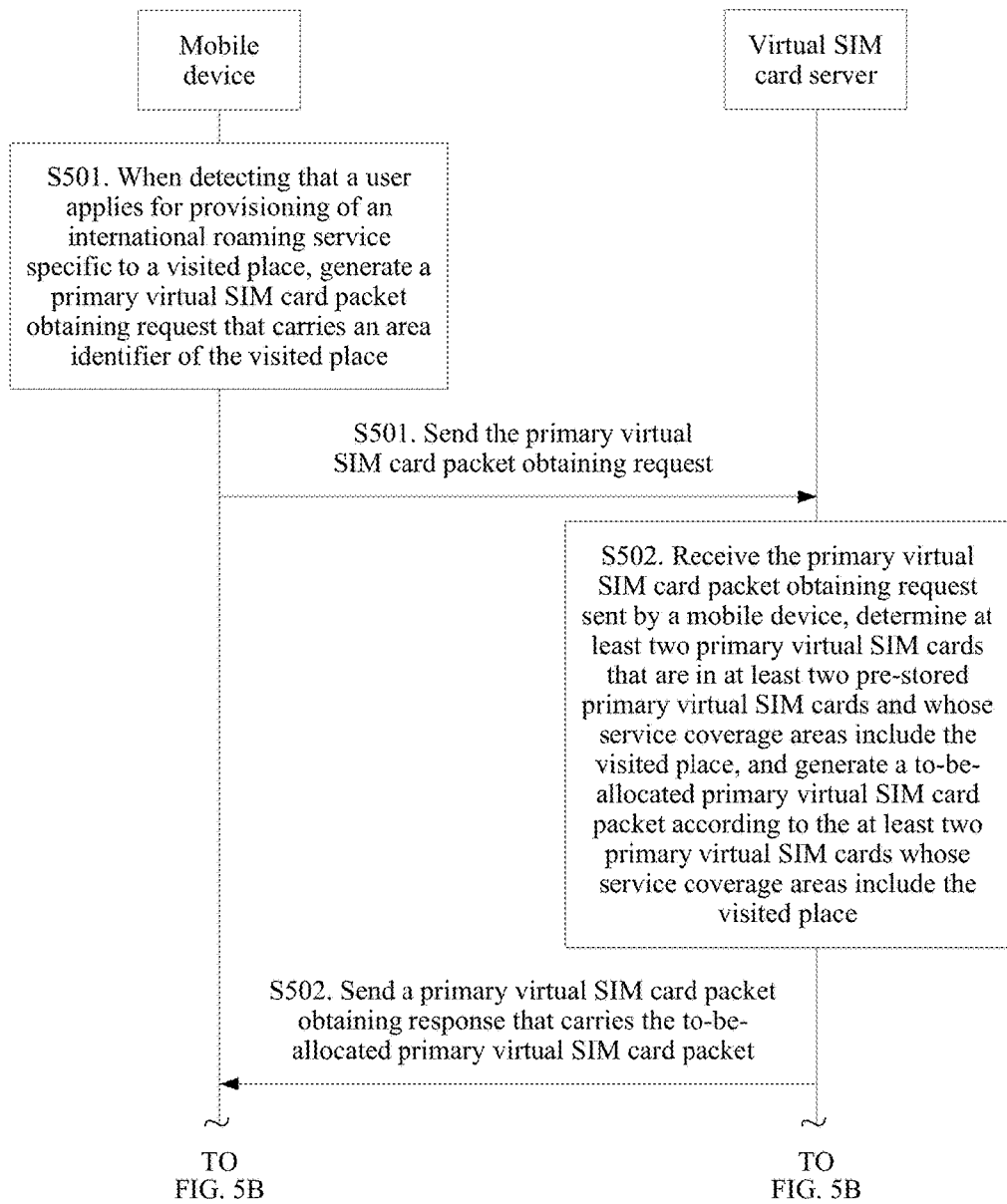

FIG. 5A and FIG. 5B are a schematic flowchart of another method for accessing a network by using a virtual SIM card according to an embodiment of the present invention. As shown in FIG. 5A and FIG. 5B, the method for accessing a network by using a virtual SIM card disclosed in this method embodiment of the present invention specifically includes the following steps.

S501. A mobile device generates a primary virtual SIM card packet obtaining request that carries an area identifier of the visited place, and sends the primary virtual SIM card packet obtaining request to a virtual SIM card server.

When detecting that a user applies for provisioning of an international roaming service specific to the visited place, the mobile device generates, according to the application of the user, the primary virtual SIM card packet obtaining request that carries the area identifier of the visited place.

S502. The virtual SIM card server receives the primary virtual SIM card packet obtaining request sent by the mobile device, determines at least two primary virtual SIM cards that are in at least two pre-stored primary virtual SIM cards and whose service coverage areas include the visited place, generates a to-be-allocated primary virtual SIM card packet according to the at least two primary virtual SIM cards whose service coverage areas include the visited place, and sends, to the mobile device, a primary virtual SIM card packet obtaining response that carries the to-be-allocated primary virtual SIM card packet.

S503. The mobile device receives the primary virtual SIM card packet obtaining response, and saves the primary virtual SIM card packet carried in the primary virtual SIM card packet obtaining response.

S504. The mobile device obtains a network environment parameter of the visited place.

S505. The mobile device determines, from the primary virtual SIM card packet, at least two candidate primary virtual SIM cards that match the network environment parameter.

S506. The mobile device downloads a secondary virtual SIM card by using an accessed primary virtual SIM card that is in the at least two candidate primary virtual SIM cards and that successfully registers with and accesses a network.

In specific implementation, when the at least two candidate primary virtual SIM cards include provider quality weights, a specific implementation of downloading the secondary virtual SIM card by using the accessed primary virtual SIM card that is in the at least two candidate primary virtual SIM cards and that successfully registers with and accesses the network is as follows:

The mobile device registers with and accesses the network in ascending order of the provider quality weights by using the at least two candidate primary virtual SIM cards, determines an accessed primary virtual SIM card that can successfully register with and access the network, and downloads the secondary virtual SIM card by using the accessed primary virtual SIM card to access the network.

In specific implementation, the mobile device sequentially performs a network registration and access operation by using each candidate primary virtual SIM card in ascending order of the provider quality weights until the mobile device finds the accessed primary virtual SIM card that successfully registers with and accesses the network, and once the accessed primary virtual SIM card successfully registers with and accesses the network, network registration and access does not need to be performed any longer. If the mobile device detects that the network is disconnected, the mobile device may continue to search for a proper primary card in this manner.

S507. The mobile device accesses a target mobile network of the visited place by using the secondary virtual SIM card.

It may be learned that, in an existing solution, the virtual SIM card server sends a single primary virtual SIM card to the mobile device, and by contrast, in the method for accessing a network by using a virtual SIM card according to this embodiment of the present invention, a situation in which the target mobile network of the visited place cannot be accessed because the single primary virtual SIM card fails to reside in the network can be avoided. Therefore, a network access success rate and network access reliability of the mobile device are improved, and user experience is improved.

In addition, the virtual SIM card server can combine a same quantity of primary virtual SIM cards into a greater quantity of primary virtual SIM card packets and allocate the primary virtual SIM card packets to more mobile devices in the foregoing primary virtual SIM card packet allocation manner, so that the primary virtual SIM cards are multiplexed, that is, the same quantity of primary virtual SIM cards can be provided for more users. Compared with a prior-art solution that a single primary virtual SIM card can be provided only for a single mobile device, this method helps improve utilization of the primary virtual SIM card and reduce operation costs.

Figure 6A:
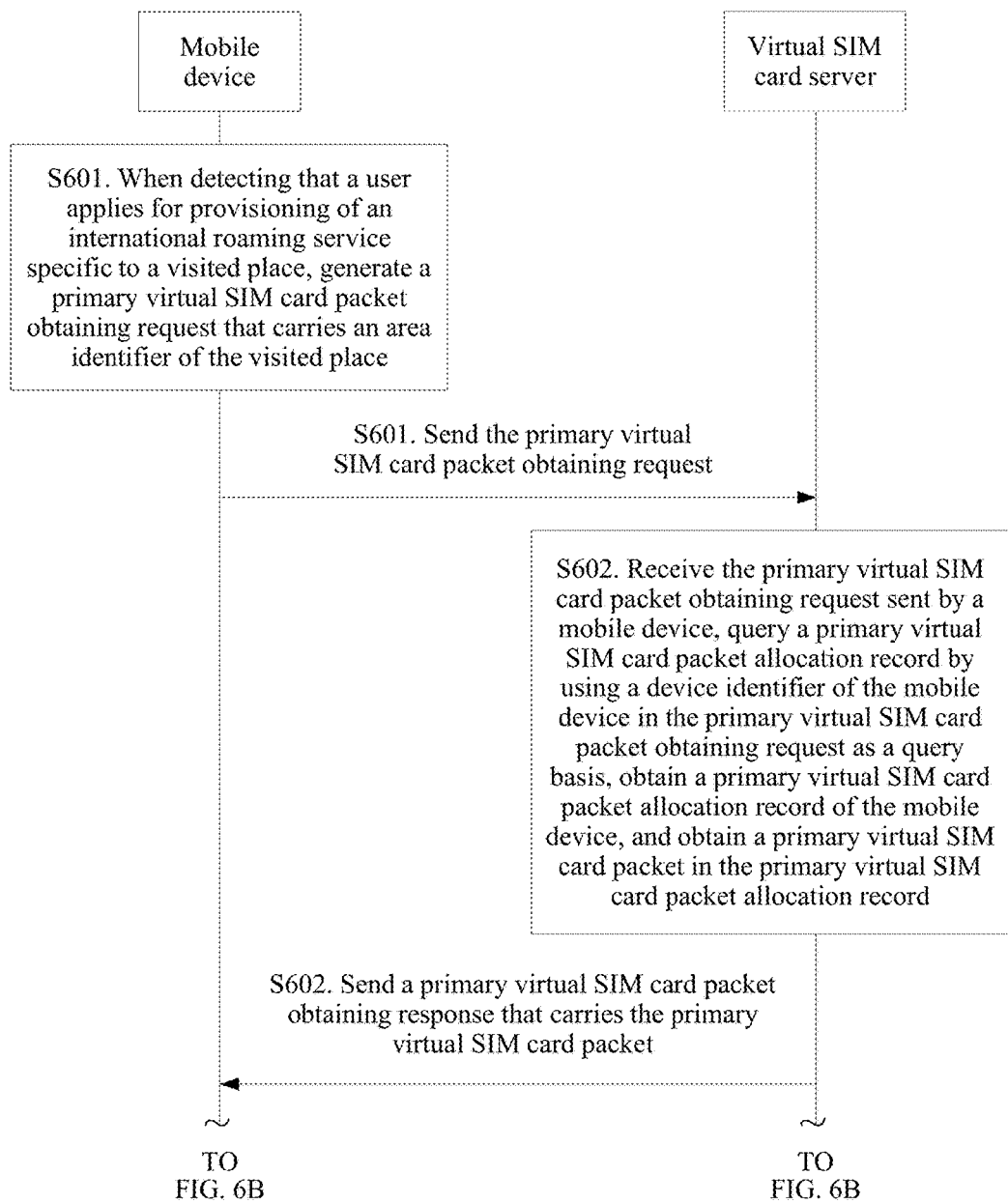

Same as the foregoing solution, FIG. 6A and FIG. 6B are a schematic flowchart of another method for accessing a network by using a virtual SIM card according to an embodiment of the present invention. As shown in FIG. 6A and FIG. 6B, the method for accessing a network by using a virtual SIM card disclosed in this method embodiment of the present invention specifically includes the following steps.

S601. A mobile device generates a primary virtual SIM card packet obtaining request that carries a device identifier of the mobile device, and sends the primary virtual SIM card packet obtaining request to a virtual SIM card server.

When detecting that a user applies for provisioning of an international roaming service specific to a visited place, the mobile device generates, according to the application of the user, the primary virtual SIM card packet obtaining request that carries an area identifier of the visited place.

S602. The virtual SIM card server receives the primary virtual SIM card packet obtaining request sent by the mobile device, queries a primary virtual SIM card packet allocation record by using the device identifier of the mobile device in the primary virtual SIM card packet obtaining request as a query basis, obtains a primary virtual SIM card packet allocation record of the mobile device, obtains a primary virtual SIM card packet in the primary virtual SIM card packet allocation record, and sends, to the mobile device, a primary virtual SIM card packet obtaining response that carries the primary virtual SIM card packet.

S603. The mobile device receives the primary virtual SIM card packet obtaining response, and saves the primary virtual SIM card packet carried in the primary virtual SIM card packet obtaining response.

S604. The mobile device obtains a network environment parameter of the visited place.

S605. The mobile device determines, from the primary virtual SIM card packet, at least two candidate primary virtual SIM cards that match the network environment parameter.

S606. The mobile device downloads a secondary virtual SIM card by using an accessed primary virtual SIM card that is in the at least two candidate primary virtual SIM cards and that successfully registers with and accesses a network.

S607. The mobile device accesses a target mobile network of the visited place by using the secondary virtual SIM card.

It may be learned that, in an existing solution, the virtual SIM card server sends a single primary virtual SIM card to the mobile device, and by contrast, in the method for accessing a network by using a virtual SIM card according to this embodiment of the present invention, a situation in which the target mobile network of the visited place cannot be accessed because the single primary virtual SIM card fails to reside in the network can be avoided. Therefore, a network access success rate and network access reliability of the mobile device are improved, and user experience is improved.

In addition, the virtual SIM card server can combine a same quantity of primary virtual SIM cards into a greater quantity of primary virtual SIM card packets and allocate the primary virtual SIM card packets to more mobile devices in the foregoing primary virtual SIM card packet allocation manner, so that the primary virtual SIM cards are multiplexed, that is, the same quantity of primary virtual SIM cards can be provided for more users. Compared with a prior-art solution that a single primary virtual SIM card can be provided only for a single mobile device, this method helps improve utilization of the primary virtual SIM card and reduce operation costs.

Figure 7:
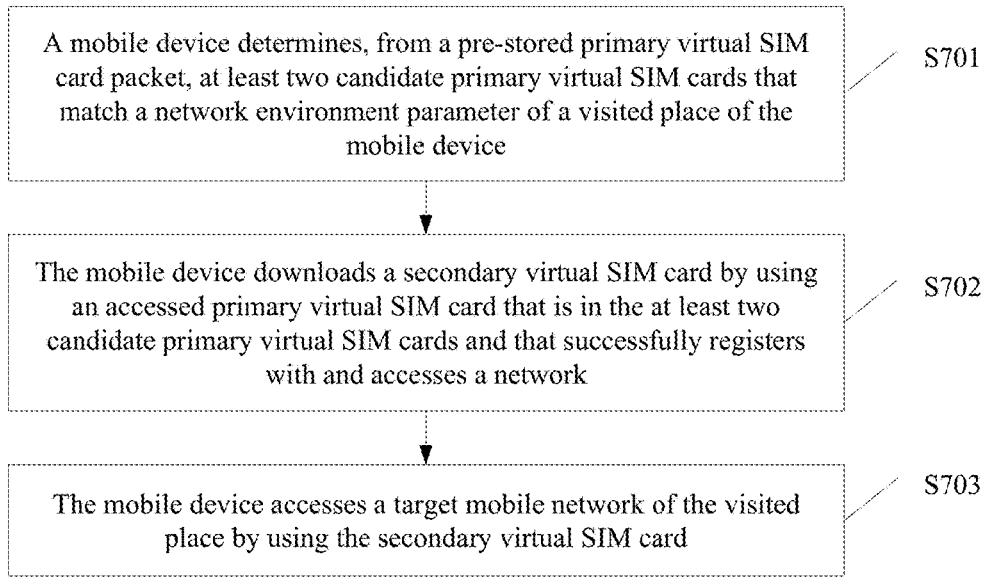
FIG. 7 is a schematic flowchart of another method for accessing a network by using a virtual SIM card according to an embodiment of the present invention.

Same as the foregoing solution, FIG. 7 is a schematic flowchart of another method for accessing a network by using a virtual SIM card according to an embodiment of the present invention. As shown in FIG. 7, the method for accessing a network by using a virtual SIM card disclosed in this method embodiment of the present invention specifically includes the following steps.

S701. The mobile device determines, from a pre-stored primary virtual SIM card packet, at least two candidate primary virtual SIM cards that match a network environment parameter of a visited place of the mobile device, where a service coverage area of the primary virtual SIM card packet includes the visited place.

S702. The mobile device downloads a secondary virtual SIM card by using an accessed primary virtual SIM card that is in the at least two candidate primary virtual SIM cards and that successfully registers with and accesses a network.

In this embodiment of the present invention, the primary virtual SIM card packet further includes a provider quality weight of a network supported by the primary virtual SIM card, and a specific implementation of downloading the secondary virtual SIM card by the mobile device by using the accessed primary virtual SIM card that is in the at least two candidate primary virtual SIM cards and that successfully registers with and accesses the network is as follows:

The mobile device registers with and accesses the network in ascending order of provider quality weights by using the at least two candidate primary virtual SIM cards, determines an accessed primary virtual SIM card that can successfully register with and access the network, and downloads the secondary virtual SIM card by using the accessed primary virtual SIM card to access the network.

S703. The mobile device accesses a target mobile network of the visited place by using the secondary virtual SIM card.

It may be learned that, in an existing solution, the virtual SIM card server sends a single primary virtual SIM card to the mobile device, and by contrast, in the method for accessing a network by using a virtual SIM card according to this embodiment of the present invention, a situation in which the target mobile network of the visited place cannot be accessed because the single primary virtual SIM card fails to reside in the network can be avoided. Therefore, a network access success rate and network access reliability of the mobile device are improved, and user experience is improved.

Optionally, in this embodiment of the present invention, the network environment parameter includes a network number of a mobile network found in the visited place, and a specific implementation of determining, by the mobile device from the pre-stored primary virtual SIM card packet, the at least two candidate primary virtual SIM cards that match the network environment parameter is as follows:

The mobile device queries, by using the network number of the mobile network as a query identifier, a network number set of networks supported by primary virtual SIM cards in the primary virtual SIM card packet, and determines at least two network number sets including the network number and at least two candidate primary virtual SIM cards corresponding to the at least two network number sets.

Optionally, in this embodiment of the present invention, the network environment parameter includes a network number of a mobile network found in the visited place, and a specific implementation of determining, by the mobile device from the pre-stored primary virtual SIM card packet, the at least two candidate primary virtual SIM cards that match the network environment parameter is as follows:

The mobile device extracts a mobile country code MCC from the network number.

The mobile device queries, by using the MCC as a query identifier, a network number set of networks supported by primary virtual SIM cards in the primary virtual SIM card packet, and determines at least two network number sets including the network number and at least two candidate primary virtual SIM cards corresponding to the at least two network number sets.

Optionally, in this embodiment of the present invention, before determining, from the pre-stored primary virtual SIM card packet, the at least two candidate primary virtual SIM cards that match the network environment parameter of the visited place of the mobile device, the mobile device further performs the following operations:

The mobile device generates a primary virtual SIM card packet obtaining request that carries an area identifier of the visited place, and sends the primary virtual SIM card packet obtaining request to the virtual SIM card server.

The mobile device receives a primary virtual SIM card packet obtaining response that is sent by the virtual SIM card server and that carries the primary virtual SIM card packet, and saves the primary virtual SIM card packet. The primary virtual SIM card packet is one of M primary virtual SIM card packets, the M primary virtual SIM card packets are obtained by the virtual SIM card server by combining N primary virtual SIM cards according to a preset primary virtual SIM card packet generation policy, N and M are positive integers, and N is less than M.

Optionally, in this embodiment of the present invention, the primary virtual SIM card packet obtaining response is generated by the virtual SIM card server after the virtual SIM card server receives the primary virtual SIM card packet obtaining request, queries multiple pre-stored primary virtual SIM card packets by using the area identifier of the visited place as a query identifier, obtains at least one unallocated primary virtual SIM card packet whose service coverage area includes the visited place, and randomly selects the primary virtual SIM card packet from the at least one primary virtual SIM card packet.

Alternatively, the primary virtual SIM card packet obtaining response is determined by the virtual SIM card server after the virtual SIM card server receives the primary virtual SIM card packet obtaining request, queries a primary virtual SIM card packet allocation record by using a device identifier of the mobile device in the primary virtual SIM card packet obtaining request as a query basis, obtains a primary virtual SIM card packet allocation record of the mobile device, and obtains a primary virtual SIM card packet in the primary virtual SIM card packet allocation record.

Optionally, in this embodiment of the present invention, the primary virtual SIM card packet obtaining response is determined by the virtual SIM card server after the virtual SIM card server receives the primary virtual SIM card packet obtaining request, determines at least two primary virtual SIM cards that are in at least two pre-stored primary virtual SIM cards and whose service coverage areas include the visited place, and generates the primary virtual SIM card packet according to the at least two primary virtual SIM cards whose service coverage areas include the visited place.

Figure 8:
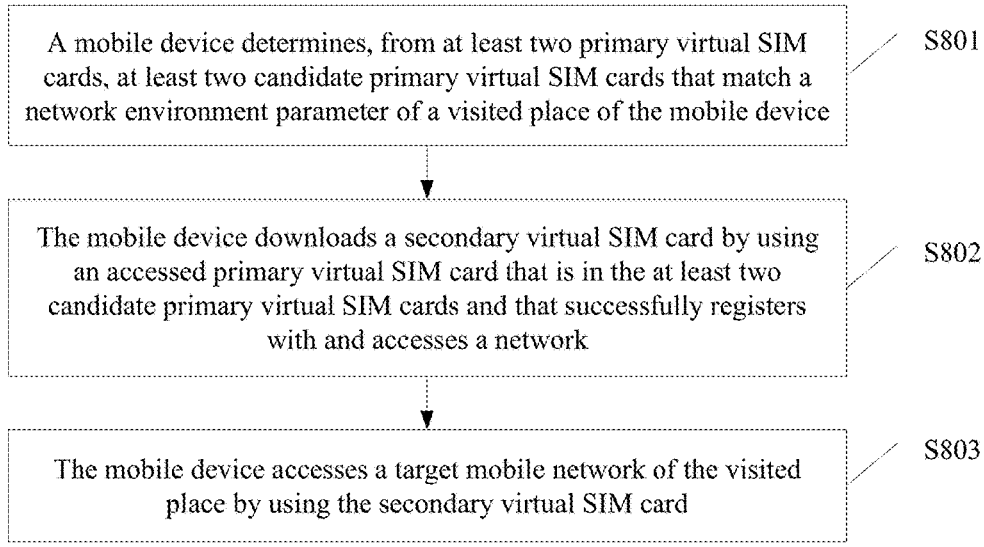
FIG. 8 is a schematic flowchart of another method for accessing a network by using a virtual SIM card according to an embodiment of the present invention.

FIG. 8 is a schematic flowchart of another method for accessing a network by using a virtual SIM card according to an embodiment of the present invention. As shown in FIG. 8, the method for accessing a network by using a virtual SIM card disclosed in this method embodiment of the present invention specifically includes the following steps.

S801. The mobile device determines, from the at least two primary virtual SIM cards, at least two candidate primary virtual SIM cards that match a network environment parameter of a visited place of the mobile device, where the mobile device stores the at least two primary virtual SIM cards.

The at least two primary virtual SIM cards stored in the mobile device include the at least two candidate primary virtual SIM cards that match the network environment parameter. When the mobile device stores two primary virtual SIM cards, both the two stored primary virtual SIM cards match the network environment parameter.

The network environment parameter of the visited place includes a network number of a mobile network found in the visited place by the mobile device.

S802. The mobile device downloads a secondary virtual SIM card by using an accessed primary virtual SIM card that is in the at least two candidate primary virtual SIM cards and that successfully registers with and accesses a network.

S803. The mobile device accesses a target mobile network of the visited place by using the secondary virtual SIM card.

It may be learned that, in an existing solution, the virtual SIM card server sends a single primary virtual SIM card to the mobile device, and by contrast, in the method for accessing a network by using a virtual SIM card according to this embodiment of the present invention, a situation in which the target mobile network of the visited place cannot be accessed because the single primary virtual SIM card fails to reside in the network can be avoided. Therefore, a network access success rate and network access reliability of the mobile device are improved, and user experience is improved.

Optionally, in this embodiment of the present invention, the network environment parameter includes the network number of the mobile network found in the visited place, and a specific implementation of determining, by the mobile device from the at least two primary virtual SIM cards, the at least two candidate primary virtual SIM cards that match the network environment parameter is as follows:

The mobile device queries, by using the network number of the mobile network as a query identifier, a network number set of networks supported by the at least two primary virtual SIM cards, and determines at least two network number sets including the network number and at least two candidate primary virtual SIM cards corresponding to the at least two network number sets.

Optionally, in this embodiment of the present invention, the network environment parameter includes the network number of the mobile network found in the visited place, and a specific implementation of determining, by the mobile device from the at least two primary virtual SIM cards, the at least two candidate primary virtual SIM cards that match the network environment parameter is as follows:

The mobile device extracts a mobile country code MCC from the network number.

The mobile device queries, by using the MCC as a query identifier, a network number set of networks supported by the at least two primary virtual SIM cards, and determines at least two network number sets including the network number and at least two candidate primary virtual SIM cards corresponding to the at least two network number sets.

Optionally, in this embodiment of the present invention, the at least two primary virtual SIM cards further include provider quality weights of the supported networks, and the mobile device downloads the secondary virtual SIM card by using the accessed primary virtual SIM card that is in the at least two candidate primary virtual SIM cards and that successfully registers with and accesses the network.

The mobile device registers with and accesses the network in ascending order of the provider quality weights by using the at least two candidate primary virtual SIM cards, determines an accessed primary virtual SIM card that can successfully register with and access the network, and downloads the secondary virtual SIM card by using the accessed primary virtual SIM card to access the network.

In specific implementation, the mobile device sequentially performs a network registration and access operation by using each candidate primary virtual SIM card in ascending order of the provider quality weights until the mobile device finds the accessed primary virtual SIM card that successfully registers with and accesses the network, and once the accessed primary virtual SIM card successfully registers with and accesses the network, network registration and access does not need to be performed any longer. If the mobile device detects that the network is disconnected, the mobile device may continue to search for a proper primary card in this manner.

Figure 9:
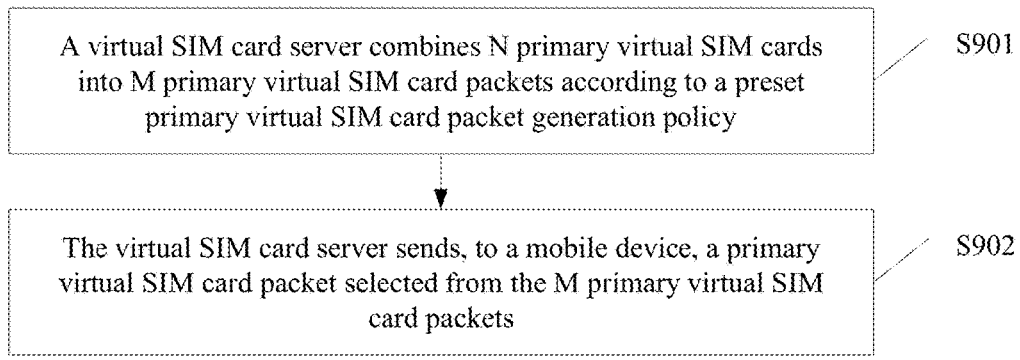
FIG. 9 is a schematic flowchart of a method for distributing a virtual SIM card according to an embodiment of the present invention.

Same as the foregoing solution, FIG. 9 is a schematic flowchart of a method for distributing a virtual SIM card according to an embodiment of the present invention. As shown in FIG. 9, the method for accessing a network by using a virtual SIM card disclosed in this method embodiment of the present invention specifically includes the following steps.

S901. A virtual SIM card server combines N primary virtual SIM cards into M primary virtual SIM card packets according to a preset primary virtual SIM card packet generation policy, where each of the second quantity of primary virtual SIM card packets includes at least two primary virtual SIM cards, N and M are positive integers, and N is less than M.

The N primary virtual SIM cards are sent by an operator server.

In specific implementation, when service coverage areas of the N primary virtual SIM cards are the same as service coverage areas of the M primary virtual SIM card packets, the preset primary virtual SIM card packet generation policy is:

a random combination policy based on a restriction that each primary virtual SIM card packet includes at least two primary virtual SIM cards.

In specific implementation, when service coverage areas of the M primary virtual SIM card packets include a first sub-area and a second sub-area, and the N primary virtual SIM cards include a third quantity of primary virtual SIM cards whose service coverage areas are the first sub-area and a fourth quantity of primary virtual SIM cards whose service coverage areas are the second sub-area, the preset primary virtual SIM card packet generation policy is:

a random combination policy based on a restriction that each primary virtual SIM card packet includes at least two primary virtual SIM cards whose service coverage areas are the first sub-area and at least two primary virtual SIM cards whose service coverage areas are the second sub-area.

S902. The virtual SIM card server sends, to a mobile device, a primary virtual SIM card packet selected from the M primary virtual SIM card packets, where a service coverage area of the primary virtual SIM card packet includes a visited place of the mobile device, and the primary virtual SIM card packet is used by the mobile device to obtain a network environment parameter of the visited place; determines, from the primary virtual SIM card packet, at least two candidate primary virtual SIM cards that match the network environment parameter; and downloads a secondary virtual SIM card by using an accessed primary virtual SIM card that is in the at least two candidate primary virtual SIM cards and that successfully registers with and accesses a network, where the secondary virtual SIM card is used for accessing a target mobile network of the visited place.

It may be understood that the virtual SIM card server may send, to the mobile device in various implementations, the primary virtual SIM card packet selected from the M primary virtual SIM card packets, and this is not limited in this embodiment of the present invention.

For example, the implementation in which the virtual SIM card server sends, to the mobile device, the primary virtual SIM card packet selected from the M primary virtual SIM card packets is as follows:

The virtual SIM card server receives a primary virtual SIM card packet obtaining request sent by the mobile device, and the primary virtual SIM card packet obtaining request carries an area identifier of the visited place.

The virtual SIM card server queries the M primary virtual SIM card packets by using the area identifier as a query identifier, and obtains at least one unallocated primary virtual SIM card packet whose service coverage area includes the visited place.

The virtual SIM card server randomly selects a primary virtual SIM card packet from the at least one primary virtual SIM card packet.

The virtual SIM card server sends, to the mobile device, a primary virtual SIM card packet obtaining response that carries the primary virtual SIM card packet.

For another example, the implementation in which the virtual SIM card server sends, to the mobile device, the primary virtual SIM card packet selected from the M primary virtual SIM card packets is as follows:

The virtual SIM card server receives a primary virtual SIM card packet obtaining request that is sent by the mobile device and that carries a device identifier of the mobile device.

The virtual SIM card server queries a pre-stored primary virtual SIM card packet allocation record by using the device identifier as a query basis, and obtains a primary virtual SIM card packet allocation record of the mobile device.

The virtual SIM card server determines a primary virtual SIM card packet in the primary virtual SIM card packet allocation record.

The virtual SIM card server sends, to the mobile device, a primary virtual SIM card packet obtaining response that carries the primary virtual SIM card packet.

It may be learned that, in the method for accessing a network by using a virtual SIM card according to this embodiment of the present invention, the virtual SIM card server can combine a same quantity of primary virtual SIM cards into a greater quantity of primary virtual SIM card packets and allocate the primary virtual SIM card packets to more mobile devices in the foregoing primary virtual SIM card packet allocation manner, so that the primary virtual SIM cards are multiplexed, that is, the same quantity of primary virtual SIM cards can be provided for more users. Compared with a prior-art solution that a single primary virtual SIM card can be provided only for a single mobile device, this method helps improve utilization of the primary virtual SIM card and reduce operation costs.

Figure 10:
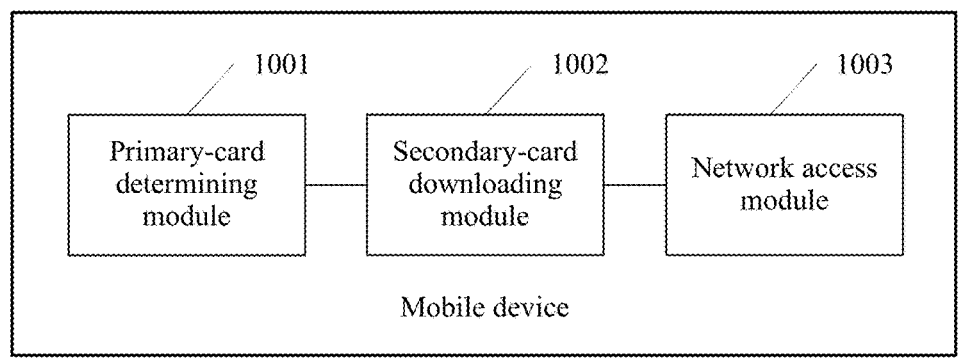
FIG. 10 is a composition block diagram of a mobile device according to an embodiment of the present invention.

The following is apparatus embodiments of the present invention. Referring to FIG. 10, FIG. 10 is a composition block diagram of a mobile device disclosed in an apparatus embodiment of the present invention. The mobile device stores at least two primary virtual SIM cards. As shown in FIG. 10, the mobile device includes a primary-card determining module 1001, a secondary-card downloading module 1002, and a network access module 1003.

The primary-card determining module 1001 is configured to determine, from at least two primary virtual SIM cards, at least two candidate primary virtual SIM cards that match a network environment parameter of a visited place of the mobile device.

The secondary-card downloading module 1002 is configured to download a secondary virtual SIM card by using an accessed primary virtual SIM card that is in the at least two candidate primary virtual SIM cards determined by the primary-card determining module 1001 and that successfully registers with and accesses a network.

The network access module 1003 is configured to access a target mobile network of the visited place by using the secondary virtual SIM card downloaded by the secondary-card downloading module 1002.

Optionally, the network environment parameter includes a network number of a mobile network found in the visited place, and the primary-card determining module is configured to:

query, by using the network number of the mobile network as a query identifier, a network number set of networks supported by the at least two primary virtual SIM cards, and determine at least two network number sets including the network number and at least two candidate primary virtual SIM cards corresponding to the at least two network number sets.

Optionally, the network environment parameter includes a network number of a mobile network found in the visited place, and the primary-card determining module is configured to:

extract a mobile country code MCC from the network number; and query, by using the MCC as a query identifier, a network number set of networks supported by the at least two primary virtual SIM cards, and determine at least two network number sets including the network number and at least two candidate primary virtual SIM cards corresponding to the at least two network number sets.

Optionally, the at least two primary virtual SIM cards further include provider quality weights of the supported networks, and the secondary-card downloading module is configured to:

register with and access the network in ascending order of the provider quality weights by using the at least two candidate primary virtual SIM cards, determine the accessed primary virtual SIM card that can successfully register with and access the network, and download the secondary virtual SIM card by using the accessed primary virtual SIM card to access the network.

It should be noted that the mobile device described in this apparatus embodiment of the present invention is presented in a form of a functional module. The term "module" used herein should be understood as a meaning as broad as possible. An object for implementing a function described for each "module" may be, for example, an integrated circuit ASIC, a single circuit, a processor (shared, dedicated, or a chip set) configured to perform one or more software or firmware programs, a memory, a combined logic circuit, and/or another suitable component that provides or implements the function.

It may be learned that, in an existing solution, only a single primary virtual SIM card is configured on the mobile device, and by contrast, according to the mobile device provided in this embodiment of the present invention, a situation in which the target mobile network of the visited place cannot be accessed because the single primary virtual SIM card fails to reside in the network can be avoided. Therefore, a network access success rate and network access reliability of the mobile device are improved, and user experience is improved.

Figure 11:
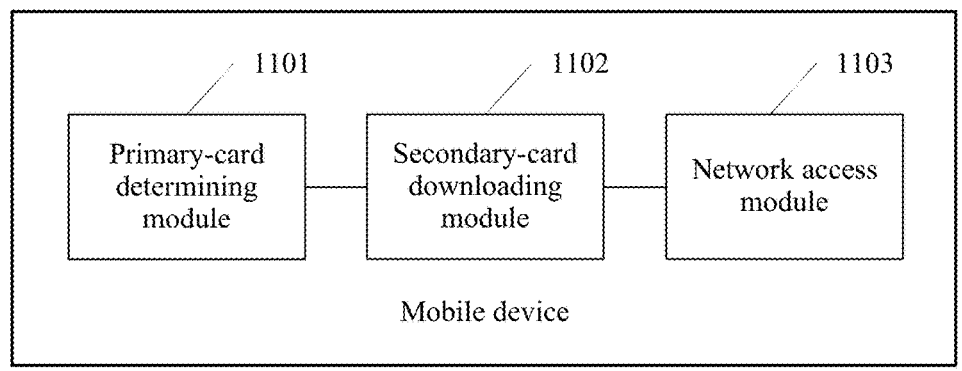
FIG. 11 is a composition block diagram of another mobile device according to an embodiment of the present invention.

Referring to FIG. 11, FIG. 11 is a composition block diagram of another mobile device disclosed in an apparatus embodiment of the present invention. The mobile device stores at least two primary virtual SIM cards. As shown in FIG. 11, the mobile device includes a primary-card determining module 1101, a secondary-card downloading module 1102, and a network access module 1103.

The primary-card determining module 1101 is configured to determine, from a pre-stored primary virtual SIM card packet, at least two candidate primary virtual SIM cards that match a network environment parameter of a visited place of the mobile device. A service coverage area of the primary virtual SIM card packet includes the visited place.

The secondary-card downloading module 1102 is configured to download a secondary virtual SIM card by using an accessed primary virtual SIM card that is in the at least two candidate primary virtual SIM cards determined by the primary-card determining module 1101 and that successfully registers with and accesses a network.

The network access module 1103 is configured to access a target mobile network of the visited place by using the secondary virtual SIM card downloaded by the secondary-card downloading module 1102.

Optionally, the network environment parameter includes a network number of a mobile network found in the visited place, and the primary-card determining module 1101 is configured to:

query, by using the network number of the mobile network as a query identifier, a network number set of networks supported by primary virtual SIM cards in the primary virtual SIM card packet, and determine at least two network number sets including the network number and at least two candidate primary virtual SIM cards corresponding to the at least two network number sets.

Optionally, the network environment parameter includes a network number of a mobile network found in the visited place, and the primary-card determining module 1101 is configured to:

extract a mobile country code MCC from the network number; and query, by using the MCC as a query identifier, a network number set of networks supported by primary virtual SIM cards in the primary virtual SIM card packet, and determine at least two network number sets including the network number and at least two candidate primary virtual SIM cards corresponding to the at least two network number sets.

Optionally, the at least two primary virtual SIM cards further include provider quality weights of the supported networks, and the secondary-card downloading module 1102 is configured to:

register with and access the network in ascending order of the provider quality weights by using the at least two candidate primary virtual SIM cards, determine an accessed primary virtual SIM card that can successfully register with and access the network, and download the secondary virtual SIM card by using the accessed primary virtual SIM card to access the network.

Optionally, the mobile device further includes:

a request generation module, configured to: before the primary-card determining module determines, from the pre-stored primary virtual SIM card packet, the at least two candidate primary virtual SIM cards that match the network environment parameter of the visited place of the mobile device, generate a primary virtual SIM card packet obtaining request that carries an area identifier of the visited place;

a request sending module, configured to send the primary virtual SIM card packet obtaining request to a virtual SIM card server; and a response receiving module, configured to: receive a primary virtual SIM card packet obtaining response that is sent by the virtual SIM card server and that carries the primary virtual SIM card packet, and save the primary virtual SIM card packet, where the primary virtual SIM card packet is one of M primary virtual SIM card packets, the M primary virtual SIM card packets are obtained by the virtual SIM card server by combining N primary virtual SIM cards according to a preset virtual SIM card packet combination policy, N and M are positive integers, and N is less than M.

Optionally, the primary virtual SIM card packet obtaining response is generated by the virtual SIM card server after the virtual SIM card server receives the primary virtual SIM card packet obtaining request, queries multiple pre-stored primary virtual SIM card packets by using the area identifier of the visited place as a query identifier, obtains at least one unallocated primary virtual SIM card packet whose service coverage area includes the visited place, and randomly selects the primary virtual SIM card packet from the at least one primary virtual SIM card packet.

Alternatively, the primary virtual SIM card packet obtaining response is determined by the virtual SIM card server after the virtual SIM card server receives the primary virtual SIM card packet obtaining request, queries a primary virtual SIM card packet allocation record by using a device identifier of the mobile device in the primary virtual SIM card packet obtaining request as a query basis, obtains a primary virtual SIM card packet allocation record of the mobile device, and obtains a primary virtual SIM card packet in the primary virtual SIM card packet allocation record.

Optionally, the primary virtual SIM card packet obtaining response is determined by the virtual SIM card server after the virtual SIM card server receives the primary virtual SIM card packet obtaining request, determines at least two primary virtual SIM cards that are in at least two pre-stored primary virtual SIM cards and whose service coverage areas include the visited place, and generates the primary virtual SIM card packet according to the at least two primary virtual SIM cards whose service coverage areas include the visited place.

It should be noted that the virtual SIM card server described in this apparatus embodiment of the present invention is presented in a form of a functional module. The term "module" used herein should be understood as a meaning as broad as possible. An object for implementing a function described for each "module" may be, for example, an integrated circuit ASIC, a single circuit, a processor (shared, dedicated, or a chip set) configured to perform one or more software or firmware programs, a memory, a combined logic circuit, and/or another suitable component that provides or implements the function.

It may be learned that, in an existing solution, only a single primary virtual SIM card is configured on the mobile device, and by contrast, according to the mobile device provided in this embodiment of the present invention, a situation in which the target mobile network of the visited place cannot be accessed because the single primary virtual SIM card fails to reside in the network can be avoided. Therefore, a network access success rate and network access reliability of the mobile device are improved, and user experience is improved.

Figure 12:
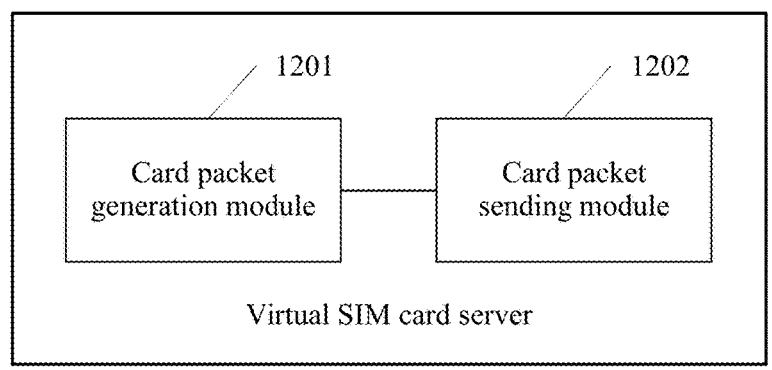
FIG. 12 is a composition block diagram of a virtual SIM card server according to an embodiment of the present invention.

Referring to FIG. 12, FIG. 12 is a composition block diagram of a virtual SIM card server disclosed in an apparatus embodiment of the present invention. As shown in FIG. 12, the virtual SIM card server includes a card packet generation module 1201 and a card packet sending module 1202.

The card packet generation module 1201 is configured to combine N primary virtual SIM cards into M primary virtual SIM card packets according to a preset primary virtual SIM card packet generation policy. N and M are positive integers, and N is less than M.

The N primary virtual SIM cards are sent by an operator server.

The card packet sending module 1202 is configured to: send, to a mobile device, a primary virtual SIM card packet selected from the M primary virtual SIM card packets generated by the card packet generation module 1201, where a service coverage area of the primary virtual SIM card packet includes a visited place of the mobile device, and the primary virtual SIM card packet is used by the mobile device to obtain a network environment parameter of the visited place; determine, from the primary virtual SIM card packet, at least two candidate primary virtual SIM cards that match the network environment parameter; and download a secondary virtual SIM card by using an accessed primary virtual SIM card that is in the at least two candidate primary virtual SIM cards and that successfully registers with and accesses a network, where the secondary virtual SIM card is used for accessing a target mobile network of the visited place.

Optionally, the card packet sending module 1202 is configured to:

receive a primary virtual SIM card packet obtaining request sent by the mobile device, where the primary virtual SIM card packet obtaining request carries an area identifier of the visited place;

query the M primary virtual SIM card packets by using the area identifier as a query identifier, and obtain at least one unallocated primary virtual SIM card packet whose service coverage area includes the visited place;

randomly select a primary virtual SIM card packet from the at least one primary virtual SIM card packet; and send, to the mobile device, a primary virtual SIM card packet obtaining response that carries the primary virtual SIM card packet.

Optionally, the card packet sending module 1202 is configured to:

receive a primary virtual SIM card packet obtaining request that is sent by the mobile device and that carries a device identifier of the mobile device;

query a pre-stored primary virtual SIM card packet allocation record by using the device identifier as a query basis, and obtain a primary virtual SIM card packet allocation record of the mobile device;

determine a primary virtual SIM card packet in the primary virtual SIM card packet allocation record; and send, to the mobile device, a primary virtual SIM card packet obtaining response that carries the primary virtual SIM card packet.

Optionally, service coverage areas of the N primary virtual SIM cards are the same as service coverage areas of the M primary virtual SIM card packets, and the preset primary virtual SIM card packet generation policy is:

a random combination policy based on a restriction that each primary virtual SIM card packet includes at least two primary virtual SIM cards.

Optionally, service coverage areas of the M primary virtual SIM card packets include a first sub-area and a second sub-area, the N primary virtual SIM cards include a third quantity of primary virtual SIM cards whose service coverage areas are the first sub-area and a fourth quantity of primary virtual SIM cards whose service coverage areas are the second sub-area, and the preset primary virtual SIM card packet generation policy is:

a random combination policy based on a restriction that each primary virtual SIM card packet includes at least two primary virtual SIM cards whose service coverage areas are the first sub-area and at least two primary virtual SIM cards whose service coverage areas are the second sub-area.

It should be noted that the virtual SIM card server described in this apparatus embodiment of the present invention is presented in a form of a functional module. The term "module" used herein should be understood as a meaning as broad as possible. An object for implementing a function described for each "module" may be, for example, an integrated circuit ASIC, a single circuit, a processor (shared, dedicated, or a chip set) configured to perform one or more software or firmware programs, a memory, a combined logic circuit, and/or another suitable component that provides or implements the function.

It may be learned that, the virtual SIM card server provided in this embodiment of the present invention can combine a same quantity of primary virtual SIM cards into a greater quantity of primary virtual SIM card packets and allocate the primary virtual SIM card packets to more mobile devices in the foregoing primary virtual SIM card packet allocation manner, so that the primary virtual SIM cards are multiplexed, that is, the same quantity of primary virtual SIM cards can be provided for more users. Compared with a prior-art solution that a single primary virtual SIM card can be provided only for a single mobile device, the virtual SIM card server helps improve utilization of the primary virtual SIM card and reduce operation costs.

An embodiment of the present invention further provides a computer storage medium. The computer storage medium may store a program, and when the program is executed, a part or all of steps of any method for accessing a network by using a virtual SIM card or any method for distributing a virtual SIM card that is recorded in the foregoing method embodiments are performed.

It should be noted that, for brief description, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic or other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments.

In addition, functional modules in the embodiments of the present invention may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer readable memory. Based on such an understanding, the technical solutions of the present invention essentially, or the part contributing to the prior art, or all or a part of the technical solutions may be implemented in the form of a software product. The software product is stored in a storage and includes several instructions for instructing a computer device (which may be a personal computer, a virtual SIM card server, or a network device) to perform all or a part of the steps of the methods described in the embodiments of the present invention. The foregoing storage includes: any medium that can store program code, such as a USB flash drive, a read-only memory (ROM, Read- Only Memory), a random access memory (RAM, Random Access Memory), a removable hard disk, a magnetic disk, or an optical disc.

A person of ordinary skill in the art may understand that all or some of the steps of the methods in the embodiments may be implemented by a program instructing relevant hardware. The program may be stored in a computer readable storage. The storage may include a flash memory, a read-only memory (English: Read-Only Memory, ROM for short), a random access memory (English: Random Access Memory, RAM for short), a magnetic disk, and an optical disc.

The embodiments of the present invention are described in detail above. The principle and implementation of the present invention are described herein through specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. In conclusion, the content of specification shall not be construed as a limit to the present invention.

What is claimed is:

1. A mobile device, comprising:
at least one processor, and a memory and a radio frequency circuit that are connected to the at least one processor, wherein the radio frequency circuit is used for wireless communications; wherein
the memory stores executable program code and at least two primary virtual subscriber identification module (SIM) cards; and
the executable program code stored in the memory instructs the at least one processor to perform operations comprising:
determining, from the at least two primary virtual SIM cards, at least two candidate primary virtual SIM cards that match a network environment parameter of a visited place of the mobile device;
downloading a secondary virtual SIM card by using an accessed primary virtual SIM card that is in the at least two candidate primary virtual SIM cards and that successfully registers with and accesses a network; and
accessing a target mobile network of the visited place by using the secondary virtual SIM card.

2. A mobile device, comprising:
at least one processor, and a memory and a radio frequency circuit that are connected to the at least one processor, wherein the radio frequency circuit is used for wireless communications; wherein
the memory stores executable program code; and
the executable program code stored in the memory instructs the at least one processor to perform operations comprising:
determining, from a pre-stored primary virtual SIM card packet, at least two candidate primary virtual SIM cards that match a network environment parameter of a visited place of a mobile device, wherein a service coverage area of the primary virtual SIM card packet comprises the visited place;
downloading a secondary virtual SIM card using an accessed primary virtual SIM card that is in the at least two candidate primary virtual SIM cards and that successfully registers with and accesses a network; and
accessing a target mobile network of the visited place using the secondary virtual SIM card.

3. A virtual SIM card server, comprising:
at least one processor, a memory, a communications interface, and a communications bus; wherein
the at least one processor, the memory, and the communications interface are connected by using the communications bus and communicate with each other using the communications bus, and the communications interface is used for wireless communications; and
the memory stores executable program code; and
the executable program code instructs the at least one processor to perform operations comprising:
combining N primary virtual SIM cards into M primary virtual SIM card packets according to a preset primary virtual SIM card packet generation policy, wherein N and M are positive integers, and N is less than M; and
sending, to a mobile device, a primary virtual SIM card packet selected from the M primary virtual SIM card packets,
wherein a service coverage area of the primary virtual SIM card packet comprises a visited place of the mobile device;
the primary virtual SIM card packet is used by the mobile device to:
obtain a network environment parameter of the visited place;
determine, from the primary virtual SIM card packet, at least two candidate primary virtual SIM cards that match the network environment parameter; and
download a secondary virtual SIM card by using an accessed primary virtual SIM card that is in the at least two candidate primary virtual SIM cards and that successfully registers with and accesses a network; and
wherein the secondary virtual SIM card is used for accessing a target mobile network of the visited place.

4. The mobile device according to claim 1, wherein the network environment parameter comprises a network number of a mobile network found in the visited place, and in response to determining the at least two candidate primary virtual SIM cards, the executable program code instructs the at least one processor to perform operations comprising:
querying, using the network number of the mobile network as a query identifier, a network number set of networks supported by the at least two primary virtual SIM cards; and
determining at least two network number sets comprising the network number and at least two candidate primary virtual SIM cards corresponding to the at least two network number sets.

5. The mobile device according to claim 1, wherein the network environment parameter comprises a network number of a mobile network found in the visited place, and in response to determining the at least two candidate primary virtual SIM cards, the executable program code instructs the at least one processor to perform operations comprising:
extracting a mobile country code (MCC) from the network number;
querying, using the MCC as a query identifier, a network number set of networks supported by the at least two primary virtual SIM cards; and
determining at least two network number sets comprising the network number and at least two candidate primary virtual SIM cards corresponding to the at least two network number sets.

6. The mobile device according to claim 1, wherein the at least two primary virtual SIM cards further comprise provider quality weights of the supported networks, and in response to downloading the secondary virtual SIM card, the executable program code instructs the at least one processor to perform operations comprising:
registering with and accessing the network in ascending order of the provider quality weights using the at least two candidate primary virtual SIM cards;
determining an accessed primary virtual SIM card that can successfully register with and access the network; and
downloading the secondary virtual SIM card using the accessed primary virtual SIM card to access the network.

7. The mobile device according to claim 2, wherein the network environment parameter comprises a network number of a mobile network found in the visited place, and in response to determining the at least two candidate primary virtual SIM cards, the executable program code instructs the at least one processor to perform operations comprising:
querying, by using the network number of the mobile network as a query identifier, a network number set of networks supported by primary virtual SIM cards in the primary virtual SIM card packet, and
determining at least two network number sets comprising the network number and at least two candidate primary virtual SIM cards corresponding to the at least two network number sets.

8. The mobile device according to claim 2, wherein the network environment parameter comprises a network number of a mobile network found in the visited place, and in response to determining the at least two candidate primary virtual SIM cards, the executable program code instructs the at least one processor to perform operations comprising:
extracting a mobile country code MCC from the network number;
querying, using the MCC as a query identifier, a network number set of networks supported by primary virtual SIM cards in the primary virtual SIM card packet; and
determining at least two network number sets comprising the network number and at least two candidate primary virtual SIM cards corresponding to the at least two network number sets.

9. The mobile device according to claim 2, wherein the primary virtual SIM card packet further comprises provider quality weights of the networks supported by the primary virtual SIM cards, and in response to downloading the secondary virtual SIM card, the executable program code instructs the at least one processor to perform operations comprising:
registering with and accessing the network in ascending order of the provider quality weights using the at least two candidate primary virtual SIM cards;
determining an accessed primary virtual SIM card that can successfully register with and access the network; and
downloading the secondary virtual SIM card using the accessed primary virtual SIM card to access the network.

10. The mobile device according to claim 2, before determining the at least two candidate primary visual SIM cards, the executable program code instructs the at least one processor to perform operations comprising:
generating a primary virtual SIM card packet obtaining request that carries an area identifier of the visited place;
sending the primary virtual SIM card packet obtaining request to a virtual SIM card server; and
receiving a primary virtual SIM card packet obtaining response that is sent by the virtual SIM card server and that carries the primary virtual SIM card packet; and
saving the primary virtual SIM card packet, wherein the primary virtual SIM card packet is one of M primary virtual SIM card packets, the M primary virtual SIM card packets are obtained by the virtual SIM card server by combining N primary virtual SIM cards according to a preset virtual SIM card packet combination policy, M and N are positive integers, and N is less than M.

11. The mobile device according to claim 10, wherein:
the primary virtual SIM card packet obtaining response is generated by the virtual SIM card server after the virtual SIM card server receives the primary virtual SIM card packet obtaining request, queries multiple pre-stored primary virtual SIM card packets by using the area identifier of the visited place as a query identifier, obtains at least one unallocated primary virtual SIM card packet whose service coverage area comprises the visited place, and randomly selects the primary virtual SIM card packet from the at least one primary virtual SIM card packet; or
the primary virtual SIM card packet obtaining response is determined by the virtual SIM card server after the virtual SIM card server receives the primary virtual SIM card packet obtaining request, queries a primary virtual SIM card packet allocation record using a device identifier of the mobile device in the primary virtual SIM card packet obtaining request as a query basis, obtains a primary virtual SIM card packet allocation record of the mobile device, and obtains a primary virtual SIM card packet in the primary virtual SIM card packet allocation record.

12. The mobile device according to claim 10, wherein the primary virtual SIM card packet obtaining response is determined by the virtual SIM card server after the virtual SIM card server receives the primary virtual SIM card packet obtaining request, determines at least two primary virtual SIM cards that are in at least two pre-stored primary virtual SIM cards and whose service coverage areas comprise the visited place, and generates the primary virtual SIM card packet according to the at least two primary virtual SIM cards whose service coverage areas comprise the visited place.

13. The virtual SIM card server according to claim 3, wherein in response to sending the primary virtual SIM card packet, the executable program code instructs the at least one processor to perform operations comprising:
receiving a primary virtual SIM card packet obtaining request sent by the mobile device, wherein the primary virtual SIM card packet obtaining request carries an area identifier of the visited place;
querying the M primary virtual SIM card packets using the area identifier as a query identifier;
obtaining at least one unallocated primary virtual SIM card packet whose service coverage area comprises the visited place;
randomly selecting a primary virtual SIM card packet from the at least one primary virtual SIM card packet; and
sending, to the mobile device, a primary virtual SIM card packet obtaining response that carries the primary virtual SIM card packet.

14. The virtual SIM card server according to claim 3, wherein in response to sending the primary virtual SIM card packet, the executable program code instructs the at least one processor to perform operations comprising:

receiving a primary virtual SIM card packet obtaining request that is sent by the mobile device and that carries a device identifier of the mobile device;

querying a pre-stored primary virtual SIM card packet allocation record by using the device identifier as a query basis;

obtaining a primary virtual SIM card packet allocation record of the mobile device;

determining a primary virtual SIM card packet in the primary virtual SIM card packet allocation record; and sending, to the mobile device, a primary virtual SIM card packet obtaining response that carries the primary virtual SIM card packet.

15. The virtual SIM card server according to claim 3, wherein service coverage areas of the N primary virtual SIM cards are the same as service coverage areas of the M primary virtual SIM card packets, and the preset primary virtual SIM card packet generation policy is:

a random combination policy based on a restriction that each primary virtual SIM card packet comprises at least two primary virtual SIM cards.

16. The virtual SIM card server according to claim 3, wherein service coverage areas of the M primary virtual SIM card packets comprise a first sub-area and a second sub-area, the N primary virtual SIM cards comprise a third quantity of primary virtual SIM cards whose service coverage areas are the first sub-area and a fourth quantity of primary virtual SIM cards whose service coverage areas are the second sub-area, and the preset primary virtual SIM card packet generation policy is:

a random combination policy based on a restriction that each primary virtual SIM card packet comprises at least two primary virtual SIM cards whose service coverage areas are the first sub-area and at least two primary virtual SIM cards whose service coverage areas are the second sub-area.

* * * * *